(12) United States Patent
Ellis et al.

(10) Patent No.: US 9,575,677 B2
(45) Date of Patent: Feb. 21, 2017

(54) STORAGE SYSTEM POWER MANAGEMENT USING CONTROLLED EXECUTION OF PENDING MEMORY COMMANDS

(71) Applicant: SanDisk Enterprise IP LLC, Milpitas, CA (US)

(72) Inventors: Robert W. Ellis, Phoenix, AZ (US); James M Higgins, Chandler, AZ (US); Mark Dancho, Chandler, AZ (US); Ryan R. Jones, Mesa, AZ (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/572,633

(22) Filed: Dec. 16, 2014

(65) Prior Publication Data
US 2015/0309752 A1 Oct. 29, 2015

Related U.S. Application Data

(60) Provisional application No. 61/985,923, filed on Apr. 29, 2014, provisional application No. 62/066,290, filed on Oct. 20, 2014.

(51) Int. Cl.
G06F 12/02 (2006.01)
G06F 3/06 (2006.01)
G06F 1/32 (2006.01)

(52) U.S. Cl.
CPC ............. *G06F 3/0625* (2013.01); *G06F 1/329* (2013.01); *G06F 1/3225* (2013.01);
(Continued)

(58) Field of Classification Search
CPC .... G06F 3/0625; G06F 3/0659; G06F 3/0679; G06F 2206/1014; G06F 3/0688; G06F 3/0634; G06F 1/329; G06F 1/3225; Y02B 60/144; Y02B 60/1246
See application file for complete search history.

(56) References Cited

U.S. PATENT DOCUMENTS 8,725,931 B1 * 5/2014 Kang .................. G06F 13/1642
710/52
8,751,836 B1 * 6/2014 Piszczek ............... G06F 1/3268
713/300

(Continued)

FOREIGN PATENT DOCUMENTS

EP  0 878 755 A1  11/1998
EP  2 602 707 A2  6/2013
WO  WO 2010/116349  10/2010

OTHER PUBLICATIONS

Internation Search Report and Written Opinion dated Jul. 14, 2015, received in International Patent Application No. PCT/US2015/027265, which corresponds to U.S. Appl. No. 14/572,619, 10 pages (Ellis).

(Continued)

*Primary Examiner* — Hiep Nguyen
(74) *Attorney, Agent, or Firm* — Morgan, Lewis & Bockius LLP

(57) ABSTRACT

The various embodiments described herein include methods and/or systems for throttling power in a storage device. In one aspect, a method of operation in a storage system includes obtaining a power metric corresponding to a count of active memory commands in the storage system, where active memory commands are commands being executed by the storage system. The method further includes, in accordance with a determination that the power metric satisfies one or more power thresholds, deferring execution of one or more pending memory commands.

21 Claims, 13 Drawing Sheets

(52) U.S. Cl.
CPC .......... *G06F 3/0659* (2013.01); *G06F 3/0679* (2013.01); *G06F 2206/1014* (2013.01)

(56) References Cited

U.S. PATENT DOCUMENTS

| | | |
|---|---|---|
| 2001/0011319 A1 | 8/2001 | Beppu |
| 2004/0267409 A1 | 12/2004 | De Lorenzo et al. |
| 2005/0108491 A1* | 5/2005 | Wong ............... G11C 29/50004 711/167 |
| 2005/0204175 A1 | 9/2005 | Burton |
| 2009/0171513 A1 | 7/2009 | Tsukazawa |
| 2010/0049905 A1 | 2/2010 | Ouchi |
| 2011/0122691 A1 | 5/2011 | Sprouse |
| 2011/0191666 A1* | 8/2011 | Decker ..................... G06F 3/14 715/234 |
| 2011/0239009 A1 | 9/2011 | Noda |
| 2012/0023346 A1 | 1/2012 | Byom et al. |
| 2012/0159057 A1 | 6/2012 | Loh et al. |
| 2012/0290864 A1 | 11/2012 | Seroff |
| 2012/0331207 A1 | 12/2012 | Lassa et al. |
| 2012/0331282 A1* | 12/2012 | Yurzola ................. G06F 1/3275 713/100 |
| 2013/0080679 A1 | 3/2013 | Bert |
| 2013/0275781 A1 | 10/2013 | Ramage et al. |
| 2013/0305008 A1* | 11/2013 | Kwon ................. G06F 13/1689 711/167 |
| 2014/0304560 A1* | 10/2014 | Narasimha .......... G06F 11/0727 714/704 |
| 2015/0323976 A1* | 11/2015 | Chen ..................... G06F 1/3293 713/323 |
| 2016/0062421 A1 | 3/2016 | Sugawara et al. |

OTHER PUBLICATIONS

International Search Report and Written Opinion dated Dec. 15, 2015, received in International Patent Application No. PCT/US2015/053641, which corresponds to U.S. Appl. No. 14/668,710, 12 pages (Thangaraj).

International Search Report and Written Opinion dated Dec. 14, 2015, received in International Patent Application No. PCT/US2015/053644, which corresponds to U.S. Appl. No. 14/668,722, 12 pages (Thangaraj).

International Search Report and Written Opinion dated Feb. 11, 2016, received in International Patent Application No. PCT/US2015/053549 which corresponds to U.S. Appl. No. 14/572,633, 13 pages (Ellis).

* cited by examiner

500

502 — In accordance with a determination to reduce power consumption by the non-volatile memory system, the non-volatile memory system including a plurality of distinct sets of non-volatile memory devices:

For each of at least two distinct sets of the plurality of distinct sets of non-volatile memory devices, defer execution of commands in a command queue corresponding to the distinct set of non-volatile memory devices during a respective wait period

504 — The respective wait period for a first distinct set of non-volatile memory devices in the at least two distinct sets is at least partially non-overlapping with the respective wait period for a second distinct set of non-volatile memory devices in the at least two distinct sets.

506 — Each of the plurality of distinct sets of non-volatile memory devices comprises a memory channel that includes a corresponding channel controller, and the command queue corresponding to the distinct set of non-volatile memory devices in the memory channel comprises a command queue for the memory channel

508 — A channel controller for a respective memory channel determines whether to defer execution of commands in the command queue for the respective memory channel in accordance with an external signal received by the channel controller.

In accordance with a determination to reduce power consumption by the non-volatile memory system, the non-volatile memory system including a plurality of distinct sets of non-volatile memory devices:

For each of at least two distinct sets of the plurality of distinct sets of non-volatile memory devices, defer execution of commands in a command queue corresponding to the distinct set of non-volatile memory devices during a respective wait period ~502

(A)

The non-volatile memory system includes M memory channels, where M is an integer greater than 1, each memory channel comprising a distinct set of non-volatile memory devices having a corresponding command queue and wait period ~510

The wait period for each memory channel of the M memory channels repeats in accordance with a duty cycle corresponding to a priority of the memory channel ~512

The wait period for each memory channel of the M memory channels has a duration based at least in part on a priority of the corresponding memory channel ~514

In accordance with a determination to reduce power consumption by the non-volatile memory system, the non-volatile memory system including a plurality of distinct sets of non-volatile memory devices:

For each of at least two distinct sets of the plurality of distinct sets of non-volatile memory devices, defer execution of commands in a command queue corresponding to the distinct set of non-volatile memory devices during a respective wait period ⟵ 502

(B)

Obtain a power measurement corresponding to power consumption by a subsystem, wherein the subsystem includes the plurality of distinct sets of non-volatile memory devices ⟵ 516

Power measurement is a measure of instantaneous power consumption by the subsystem ⟵ 518

Power measurement is received from a device external to the non-volatile memory system ⟵ 520

Obtaining the power measurement is in accordance with a power measurement frequency ⟵ 522

Make said determination to reduce power consumption by the non-volatile memory system in accordance with the obtained power measurement and one or more power thresholds ⟵ 524

STORAGE SYSTEM POWER MANAGEMENT USING CONTROLLED EXECUTION OF PENDING MEMORY COMMANDS

RELATED APPLICATIONS

This application claims priority to U.S. Provisional Application No. 61/985,923, filed Apr. 29, 2014, and U.S. Provisional Application No. 62/066,290, filed Oct. 20, 2014, both of which are hereby incorporated by reference in their entirety.

TECHNICAL FIELD

The disclosed embodiments relate generally to storage controller systems, and in particular, to credit-based power management in storage systems.

BACKGROUND

Semiconductor storage systems are commonly used for storing and managing data for electronic devices. A typical non-volatile data storage system stores data as an electrical value in the memory cells of the storage system and memory controllers are generally tasked with managing data transactions across multiple memory devices of the storage system.

Data transactions in data storage systems are generally carried out by executions of memory commands. To facilitate this process, memory controllers are often constructed with command queues that help optimize command executions across multiple memory cells. Multiple commands executed in parallel across the storage system, however, can result in spikes in power consumption.

SUMMARY

Various embodiments of systems, methods, and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to manage power consumption in storage devices (e.g., solid-state drives, sometimes called SSD's). In one aspect, a storage device includes a power throttling module and one or more non-volatile memory controllers coupled to the power throttling module. The storage device also includes a plurality of non-volatile memory devices, each non-volatile memory device in the plurality of non-volatile memory devices coupled to a particular non-volatile memory controller of the one or more non-volatile memory controllers. The storage device is configured to obtain a power metric corresponding to a count of active memory commands in the storage system, where active memory commands are commands being executed by the storage system. The storage device is further configured to, in accordance with a determination that the power metric satisfies one or more power thresholds, defer execution of one or more pending memory commands.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 5A-5E illustrate a flowchart representation of a method of deferring execution of commands in a command queue, in accordance with some embodiments.

Figure 1:
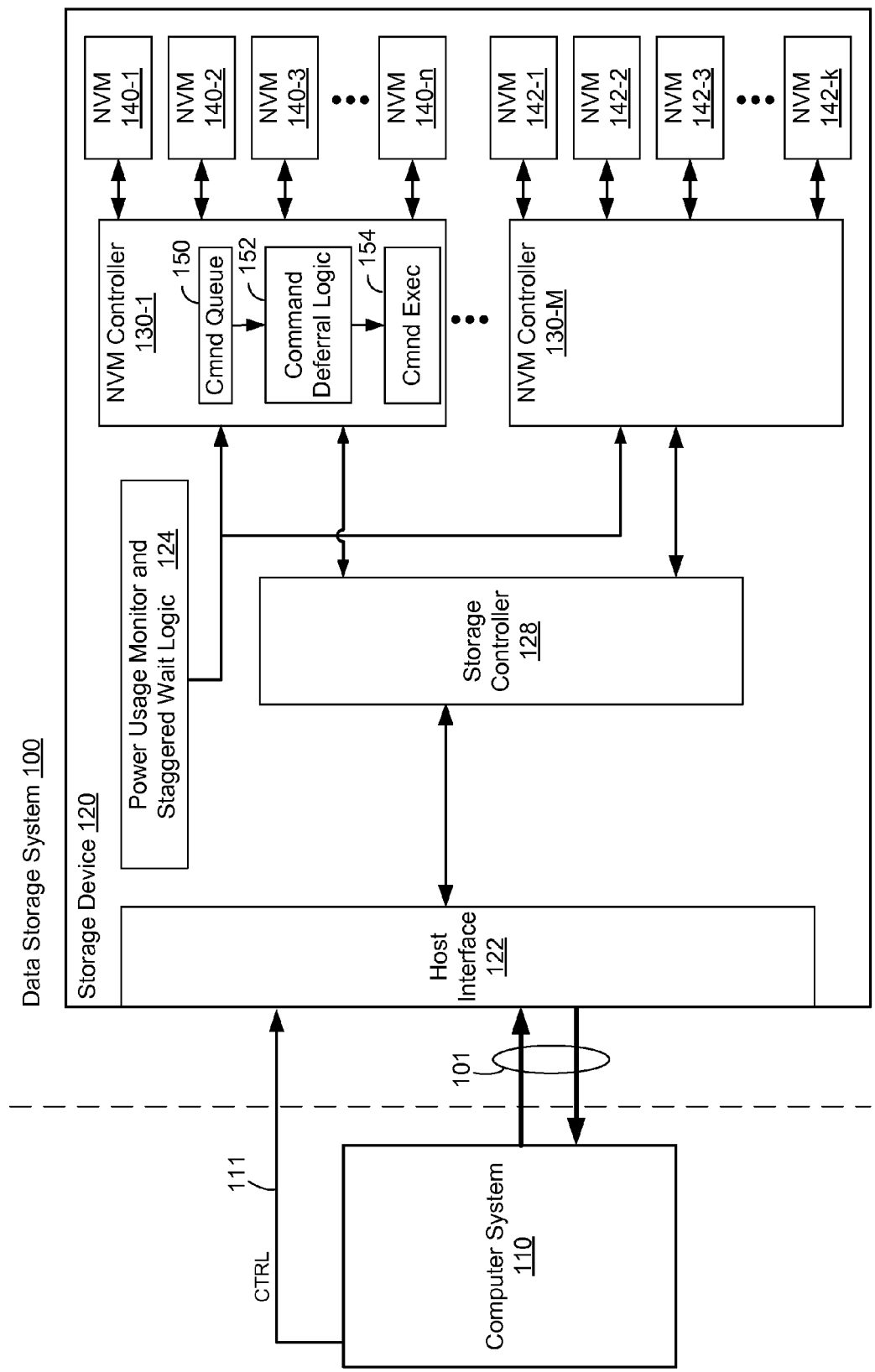
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various embodiments described herein include systems, methods, and/or devices used to manage power consumption in storage systems. Some embodiments include systems, methods, and/or devices to defer execution of pending memory commands.

(A1) In one aspect, some embodiments include a method of operation in a storage system. In some embodiments, a method of operation in a storage system includes obtaining a power metric corresponding to a count of active memory commands in the storage system, where active memory commands are commands being executed by the storage system. The method further includes, in accordance with a determination that the power metric satisfies one or more power thresholds, deferring execution of one or more pending memory commands.

(A2) In some embodiments of the method of A1, the storage system comprises a plurality of distinct sets of storage devices and deferring execution of the one or more memory commands comprises, for each distinct set of storage devices in at least a subset of the plurality of distinct sets of storage devices, deferring execution of one or more memory commands corresponding to the respective set of storage devices during a respective wait period, where the respective wait period for a first distinct set of storage devices in the at least a subset of the plurality of distinct sets is at least partially non-overlapping with the respective wait period for a second distinct set of non-volatile memory devices in the at least a subset of the plurality of distinct sets.

(A3) In some embodiments of the method of A1, the storage system comprises a plurality of distinct sets of storage devices and wherein the count of active memory commands comprises a count of active memory commands within a subset of the plurality of distinct sets of storage devices.

(A4) In some embodiments of the method of any of A1-A3, the method further comprises obtaining a second power metric and adjusting at least one of the one or more power thresholds based on the second power metric.

(A5) In some embodiments of the method of A4, the second power metric corresponds to a measure of heat associated with the storage device.

(A6) In some embodiments of the method of any of A4-A5, the second power metric corresponds to a measure of a current drawn by the storage device.

(A7) In some embodiments of the method of any of A4-A6, the second power metric corresponds to a measure of power consumption of the storage device.

(A8) In some embodiments of the method of any of A4-A7, the second power metric is based at least in part on a parameter in an external command.

(A9) In some embodiments of the method of any of A1-A8, the method further comprises adjusting at least one of the one or more power thresholds based on a mode of operation of the storage system.

(A10) In some embodiments of the method of any of A1-A9: (1) the count of active memory commands is a weighted count of a plurality of active memory commands; (2) each memory command has a respective memory command type of a plurality of distinct memory command types; and (3) each distinct memory command type has a respective weight.

(A11) In some embodiments of the method of any of A1-A10: (1) the storage system comprises a plurality of distinct sections, each section coupled to a distinct power supply; (2) the count of active memory commands comprises a count of active memory commands in a first section of the plurality of distinct sections; and (3) deferring execution of the one or more memory commands comprises deferring execution of one or more active memory commands in the first section.

(A12) In some embodiments of the method of any of A1-A11, the one or more pending memory commands are represented by entries in one or more command queues.

(A13) In some embodiments of the method of A2, each of the plurality of distinct sets of storage devices comprises a memory channel that includes a corresponding channel controller and a command queue for storing pending memory commands for the memory channel.

(A14) In some embodiments of the method of A13, the method further includes overriding the deferred execution of one or more pending commands in a respective command queue corresponding to a distinct set of non-volatile memory devices of the plurality of distinct sets of non-volatile memory devices.

(A15) In some embodiments of the method of A14, overriding the deferred execution of commands in the respective command queue is based at least in part on a priority of the corresponding distinct set of non-volatile memory devices.

(A16) In some embodiments of the method of A14, overriding the deferred execution of commands in the respective command queue is based at least in part on a priority of one or more of the commands in the respective command queue.

(A17) In some embodiments of the method of A13, the storage system includes M memory channels, each memory channel comprising a distinct set of non-volatile memory devices having a corresponding command queue, and the method further includes restarting execution of commands in command queues of the M memory channels at M distinct staggered start times, where M is an integer greater than 1.

(A18) In some embodiments of the method of A17, each memory channel of the M memory channels further comprises a channel controller configured to receive an external signal and to defer execution of commands in the command queue corresponding to the memory channel in accordance with the external signal.

(A19) In some embodiments of the method of any of A17-A18, each of the M distinct staggered start times corresponds to an end of a wait period for a corresponding memory channel, wherein the wait periods for the M memory channels have staggered end times corresponding to said M distinct start times.

(A20) In some embodiments of the method of any of A1-A19, the storage system includes M memory channels, where M is an integer greater than 1, each memory channel comprising a distinct set of non-volatile memory devices having a corresponding command queue and wait period that repeats in accordance with a duty cycle corresponding to a priority of the memory channel.

(A21) In some embodiments of the method of any of A1-A19, the storage system includes M memory channels, where M is an integer greater than 1, each memory channel comprising a distinct set of non-volatile memory devices having a corresponding command queue and wait period having a duration based at least in part on a priority of the memory channel.

In another aspect, some embodiments include a storage device. In some embodiments, the storage device includes a power throttling module. The storage device also includes one or more non-volatile memory controllers coupled to the power throttling module. The storage device further includes a plurality of non-volatile memory devices, each non-volatile memory device in the plurality of non-volatile memory devices coupled to a particular non-volatile memory controller of the one or more non-volatile memory controllers. In addition, the storage device is configured to obtain a power metric corresponding to a count of active memory commands in the storage system, where active memory commands are commands being executed by the storage system. The storage device is further configured to, in accordance with a determination that the power metric satisfies one or more power thresholds, defer execution of one or more pending memory commands.

In some embodiments, the storage device is further configured to operate in accordance with any of the methods described herein.

In yet another aspect, some embodiments include a non-transitory computer-readable storage medium storing one or more programs for execution by one or more processors of a storage device, the one or more programs including instructions for performing any of the methods described herein.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1 is a block diagram illustrating an implementation of a data storage system 100, in accordance with some embodiments. While some example features are illustrated, various other features have not been illustrated for the sake of brevity and so as not to obscure more pertinent aspects of the example embodiments disclosed herein. To that end, as a non-limiting example, data storage system 100 includes storage device 120 (also sometimes called an information storage device, or a data storage device, or a memory device), which includes host interface 122, power usage monitor and staggered wait logic 124, storage controller 128, one or more non-volatile memory (NVM) controllers 130 such as flash controllers, and non-volatile memory (e.g., one or more NVM device(s) 140, 142 such as one or more flash memory devices), and is used in conjunction with computer system 110. In some embodiments, storage device 120 includes a single NVM device while in other embodiments storage device 120 includes a plurality of NVM devices. In some embodiments, NVM devices 140, 142 include NAND-type flash memory or NOR-type flash memory. Further, in some embodiments, NVM controller 130 is a solid-state drive (SSD) controller. However, one or more other types of storage media may be included in accordance with aspects of a wide variety of embodiments.

Computer system 110 is coupled to storage device 120 through data connections 101. However, in some embodiments computer system 110 includes storage device 120 as a component and/or sub-system. Computer system 110 may be any suitable computer device, such as a personal computer, a workstation, a computer server, or any other computing device. Computer system 110 is sometimes called a host or host system. In some embodiments, computer system 110 includes one or more processors, one or more types of memory, optionally includes a display and/or other user interface components such as a keyboard, a touch screen display, a mouse, a track-pad, a digital camera and/or any number of supplemental devices to add functionality. Further, in some embodiments, computer system 110 sends one or more host commands (e.g., read commands and/or write commands) on control line 111 to storage device 120. In some embodiments, computer system 110 is a server system, such as a server system in a data center, and does not have a display and other user interface components.

In some embodiments, storage device 120 includes NVM devices 140, 142 such as flash memory devices (e.g., NVM devices 140-1 through 140-n and NVM devices 142-1 through 142-k) and NVM controllers 130 (e.g., NVM controllers 130-1 through 130-M). Viewed another way, storage device 120 includes M memory channels, each of which has an NVM controller 130 and a set of NVM devices 140 or 142 coupled to the NVM controller 130, where M is an integer greater than one. However, in some embodiments, two or more memory channels share an NVM controller 130. In either example, each memory channel has its own distinct set of NVM devices 140 or 142. In a non-limiting example, the number of memory channels in a typical storage device is 8, 16 or 32. In another non-limiting example, the number of NVM devices 140 or 142 per memory channel is typically 8, 16, 32 or 64. Furthermore, in some embodiments, the number of NVM devices 140/142 is different in different memory channels.

In some embodiments, each NVM controller 130 includes one or more processing units (also sometimes called CPUs or processors or microprocessors or microcontrollers) configured to execute instructions in one or more programs (e.g., stored in memory in the NVM controller 130). In some embodiments, the one or more processors are shared by one or more components within, and in some cases, beyond the function of NVM controllers 130. NVM devices 140, 142 are coupled to NVM controllers 130 through connections that convey commands in addition to data, and optionally convey metadata, error correction information and/or other information in addition to data values to be stored in NVM devices 140, 142 and data values read from NVM devices 140, 142.

In some embodiments, storage device 120 is configured for enterprise storage suitable for applications such as cloud computing, or for caching data stored (or to be stored) in secondary storage, such as hard disk drives. In some other embodiments, storage device 120 is configured for relatively smaller-scale applications such as personal flash drives or hard-disk replacements for personal, laptop and tablet computers. Although flash memory devices and flash controllers are used as an example here, in some embodiments storage device 120 includes other non-volatile memory device(s) and corresponding non-volatile storage controller(s).

Furthermore, in some embodiments, NVM controllers 130 each include one or more command queues 150, command deferral logic 152, and a command executor 154.

In some embodiments, command queue 150 in a respective NVM controller 130 is used to hold commands waiting for execution by a set of NVM devices 140 or 142 coupled to the respective NVM controller 130. A respective command queue 150, when not empty, contains one or more commands corresponding to read, write and/or erase operations for reading data from, writing data to, or erasing data from a corresponding set of NVM devices (e.g., NVM devices 140 or 142). In some embodiments, commands in command queue 150 include host commands received from computer system 110. The combination of a set of NVM devices 140 (e.g., NVM devices 140-1 through 140-n), and a corresponding NVM controller 130 (e.g., NVM controller 130-1) is sometimes referred to as a memory channel (e.g., memory channel i, FIG. 2A). Storage device 120 can include as many memory channels as there are distinct sets of NVM devices to which commands can be dispatched in parallel by a set of NVM controllers.

Command deferral logic 152 is coupled to command queue 150, and includes logic for determining whether to defer execution of commands in one or more command queues 150. In some embodiments, command deferral logic 152 defers execution of commands in command queue 150 in accordance with the one or more external signals (e.g., Ch 1 Deferral Signal 308, FIG. 3A) received from power usage monitor and staggered wait logic 124. In some embodiments, command deferral logic 152 in a respective memory channel is implemented by a set of instructions in one or more programs executed by the NVM controller 130 for that memory channel. 130-M In some embodiments, in a respective memory channel, command executor 154 dispatches commands from command queue 150 to the NVM devices 140 or 142 in that memory channel, and command deferral logic 152 defers the dispatching of commands from the command queue 150 to the NVM devices 140 or 142 in the memory channel.

In some embodiments, power usage monitor and staggered wait logic 124 is coupled to and provides one or more external signals (e.g., Ch 1 Deferral Signal 308, FIG. 3A) to NVM controllers 130. In some embodiments, power usage monitor and staggered wait logic 124 includes circuitry (e.g., power monitor 310 and power threshold comparison module 312, FIG. 3A) for measuring and monitoring power consumption by storage device 120 or by a subsystem of storage device 120. In one example, the subsystem for which power is monitored includes all the memory channels of storage device 120 (e.g., all the NVM controllers 130 and all the NVM devices 140, 142 controlled by the NVM controllers), and in another example the subsystem for which power is monitored includes all the NVM devices 140, 142 in the memory channels of storage device 120, but not the NVM controllers 130, storage controller 128 and host interface 122. Various embodiments of power usage monitor and staggered wait logic 124 are described below with reference to FIGS. 3A and 3B.

In some embodiments, command executor 154 is configured to defer and/or restart execution of commands in command queue 150. Deferring and/or restarting execution of commands, in some embodiments, is in accordance with the output of command deferral logic 152.

In some embodiments, storage device 120 also includes one or more of host interface 122, power usage monitor and staggered wait logic 124, and storage controller 128. Optionally, storage device 120 includes various additional features that have not been illustrated for the sake of brevity and so as not to obscure more pertinent features of the example embodiments disclosed herein, and a different arrangement of features may be possible. Host interface 122 provides an interface to computer system 110 through data connections 101.

Storage controller 128 is coupled to host interface 122 and NVM controllers 130. In some embodiments, during a write operation, storage controller 128 receives data from computer system 110 through host interface 122 and during a read operation, storage controller 128 sends data to computer system 110 through host interface 122. Further, host interface 122 provides additional data, signals, voltages, and/or other information needed for communication between storage controller 128 and computer system 110. In some embodiments, storage controller 128 and host interface 122 use a defined interface standard for communication, such as double data rate type three synchronous dynamic random access memory (DDR3). In some embodiments, storage controller 128 and NVM controllers 130 use a defined interface standard for communication, such as serial advance technology attachment (SATA). In some other embodiments, the device interface used by storage controller 128 to communicate with NVM controllers 130 is SAS (serial attached SCSI), or other storage interface. In some embodiments, the storage device is or includes a solid-state drive implemented as a dual in-line memory module (DIMM) device, compatible with a DIMM memory slot. For example, in some embodiments, the storage device is compatible with a 240-pin DIMM memory slot using a DDR3 interface specification.

Figure 2A:
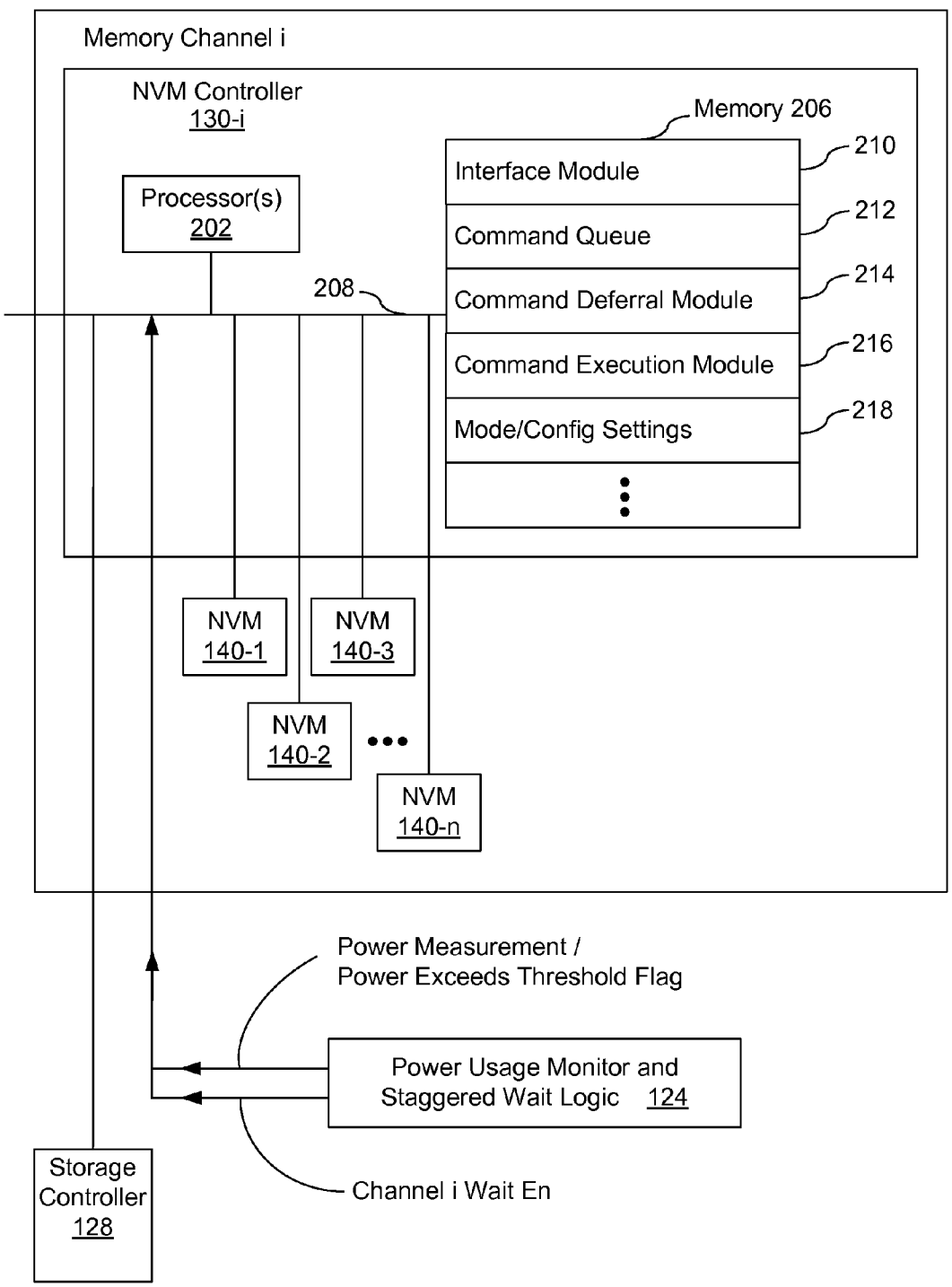
FIG. 2A is a block diagram illustrating an implementation of a memory channel, a power usage monitor, and staggered wait logic, in accordance with some embodiments.

FIG. 2A is a block diagram illustrating an implementation of a memory channel, memory channel i, and power usage monitor and staggered wait logic 124, in accordance with some embodiments. In some embodiments, memory channel i includes NVM controller 130-i, NVM devices 140-1 through 140-n, one or more processors (also sometimes called CPUs or processing units or microprocessors or microcontrollers) 202 for executing modules, programs and/or instructions stored in memory 206 and thereby performing processing operations, memory 206, and one or more communication buses 208 for interconnecting these components. However, in some other embodiments, one or more of the functions described below as being performed by processor(s) 202 are instead performed by storage controller 128.

Communication buses 208 optionally include circuitry (sometimes called a chipset) that interconnects and controls communications between system components. Power usage monitor and staggered wait logic 124 is coupled to NVM controller 130, as discussed in more detail below. 130-M Power usage monitor and staggered wait logic 124 is coupled to and provides control signals (e.g., Ch 1 Deferral Signal 308, FIG. 3A) to NVM controllers 130. The control signals are sometimes herein called external signals (from the viewpoint of the individual NVM controllers 130) or command execution deferral signals. Various embodiments of power usage monitor and staggered wait logic 124 are described below with reference to FIGS. 3A and 3B.

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processor(s) 202. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset thereof:

- interface module 210, which is used for handling communications with storage controller 128;
- a command queue 212 that stores commands corresponding to various operations (e.g., read, write and erase) which, when executed, operate on data held within the NVM devices 140 or 142; in some embodiments, a respective memory channel has more than one command queue 212;
- command deferral module 214, which determines whether to defer execution of commands in one or more command queues (e.g., command queue 212) in accordance with one or more signals generated by power usage monitor and staggered wait logic 124;
- command execution module 216, which dispatches commands from one or more command queues (e.g., command queue 212) to the NVM devices 140 in memory channel i for execution; command deferral module 214 determines when to suspend and when to resume operation of command execution module 216; and
- optionally, mode and/or configuration settings 218 for memory channel i; for example, in some embodiments mode and/or configuration settings 218 include a setting (e.g., a setting called "command deferral enable") that indicates whether command deferral is enabled for memory channel i; in another example, in some embodiments mode and/or configuration settings 218 include a setting (e.g., a setting called "high priority channel") that indicates whether memory channel i is a high priority memory channel, in which case command deferral is not enabled for memory channel i. In some embodiments, one or more values in mode and/or configuration settings 218 are set in accordance with commands received from host computer 110.

In some embodiments, memory 206, or the computer readable storage medium of memory 206 further stores a configuration module for configuring NVM controller 130-i. In some embodiments, upon power up and upon reset, the configuration module automatically sets the values of one or more configuration parameters of NVM controller 130-*i* in accordance with the components of memory channel i (e.g., the type of non-volatile memory components in memory channel i) and/or characteristics of storage device 120 and/or data storage system 100, which includes storage device 120.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing at least those portions of the methods described below with reference to FIGS. 5A-5E that are performed by or within a respective memory channel i.

Although FIG. 2A shows memory channel i, FIG. 2A is intended more as a functional description of the various features which may be present in a memory channel than as a structural schematic of the embodiments described herein. In practice, and as recognized by those of ordinary skill in the art, items shown separately could be combined and some items could be separated.

Figure 2B:
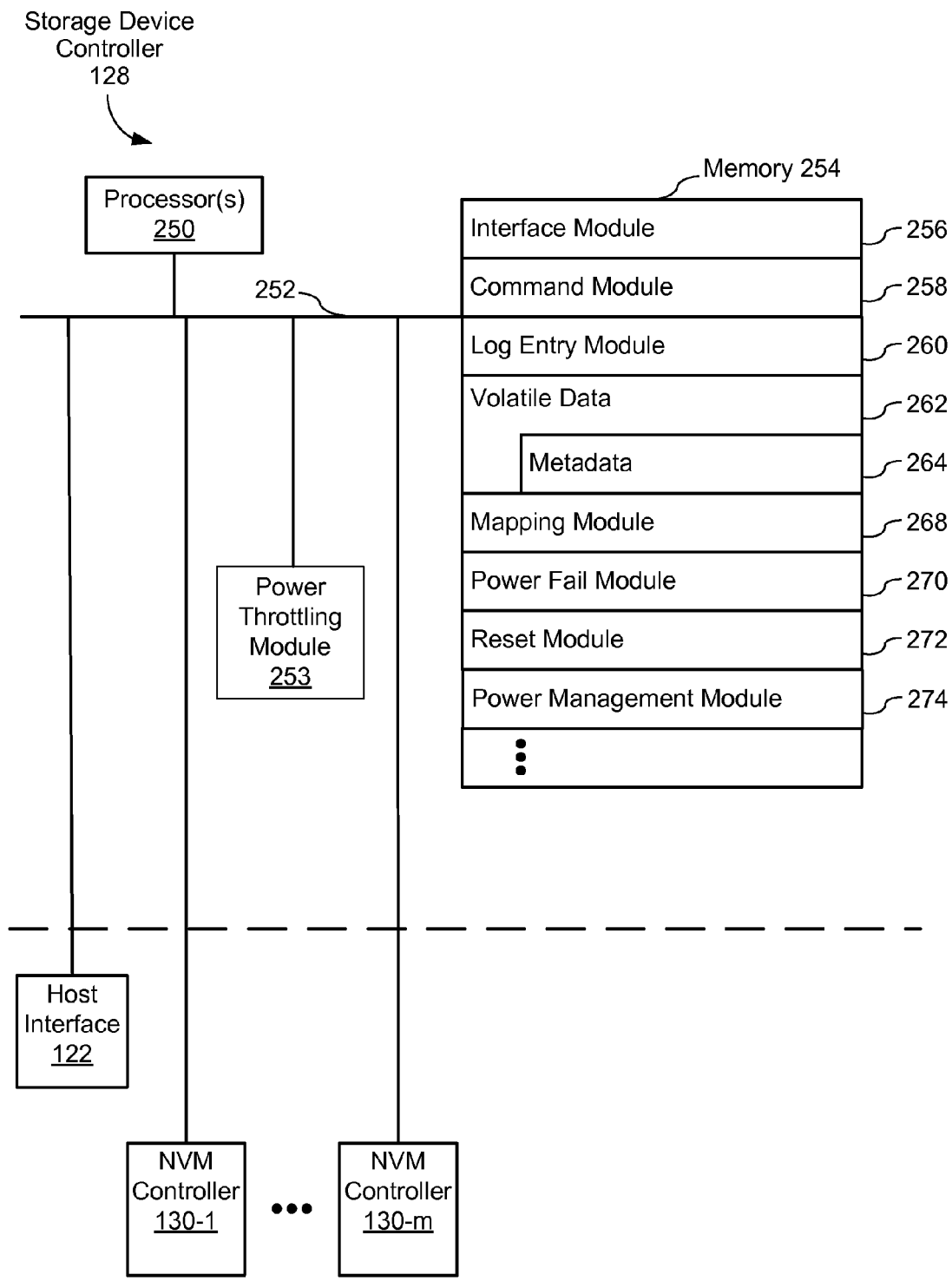
FIG. 2B is a block diagram illustrating an implementation of a storage device controller, in accordance with some embodiments.

FIG. 2B is a block diagram illustrating an implementation of storage device controller 128, in accordance with some embodiments. Storage device controller 128 typically includes: one or more processors (also sometimes called CPUs or processing units or microprocessors or microcontrollers) 250 for executing modules, programs and/or instructions stored in memory 254 and thereby performing processing operations; memory 254; and one or more communication buses 252 for interconnecting these components. One or more communication buses 252, optionally, include circuitry (sometimes called a chipset) that interconnects and controls communications between system components. In some embodiments, storage device controller 128 includes power throttling module 253, or portions thereof, as described below with reference to FIG. 6.

Storage device controller 128 is operatively coupled to host interface 122, non-volatile memory controllers 130 (e.g., NVM controller 130-1 through 130-*m*) by communication buses 252. Memory 254 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the information stored in memory 254 includes volatile data 262 corresponding to portions of non-volatile memory within the data storage system (e.g., NVMs 140, FIG. 1). In some embodiments, the information stored in memory 254 includes metadata 264 (e.g., metadata comprising age category, known-bad portion, etc.) corresponding to portions of the non-volatile memory. Memory 254, optionally, includes one or more storage devices remotely located from the one or more CPUs 250. Memory 254, or alternatively the non-volatile memory device(s) within memory 254, comprises a non-transitory computer readable storage medium. In some embodiments, memory 254, or the non-transitory computer readable storage medium of memory 254, stores the following programs, modules, and data structures, or a subset or superset thereof:

- interface module 256 that is used for communicating with other components, such as host interface 122 and non-volatile controllers 130;
- command module 258 for performing various memory operations (e.g., read, transfer, program, and/or erase operations), optionally, in accordance with commands from computer system 110;
- log entry module 260 for generating a log entry associated with respective data;
- mapping module 268, which maps logical addresses in a logical address space (e.g., a logical address space of a host or client system) to physical addresses in a physical address space (e.g., a physical address space of storage device 120) for respective portions of the non-volatile memory within a data storage system, and optionally maps physical addresses for respective portions of the non-volatile memory to logical addresses;
- power fail module 270 that is used for performing a power fail operation or a soft power fail operation;
- reset module 272 that is used for resetting storage device controller 128; and
- power management module 274 used in conjunction with power throttling module 253 to manage power consumption of storage device 120.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 254 may store a subset of the modules and data structures identified above. Furthermore, memory 254 may store additional modules and data structures not described above. In some embodiments, the programs, modules, and data structures stored in memory 254, or the computer readable storage medium of memory 254, provide instructions for implementing respective operations in the methods described below with reference to FIGS. 7A-7B.

Although FIG. 2B shows a storage device controller 128, FIG. 2B is intended more as a functional description of the various features which may be present in a memory controller than as a structural schematic of the embodiments described herein. In practice, and as recognized by those of ordinary skill in the art, items shown separately could be combined and some items could be separated.

Figure 3A:
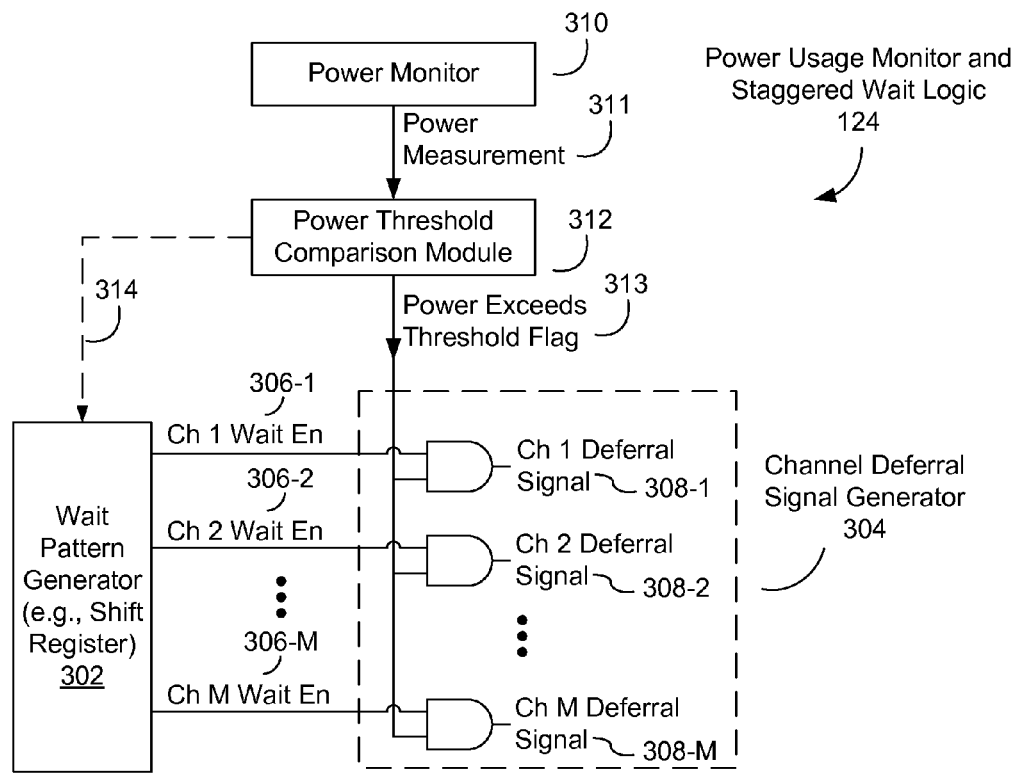
FIG. 3A is a block diagram illustrating an implementation of a power usage monitor and staggered wait logic, in accordance with some embodiments.

FIG. 3A is a block diagram illustrating an implementation of a power usage monitor and staggered wait logic 124, in accordance with some embodiments. While some example features are illustrated, various other features have not been illustrated for the sake of brevity and so as not to obscure more pertinent aspects of the example embodiments disclosed herein. To that end, as a non-limiting example, power usage monitor and staggered wait logic 124 includes power monitor 310, power threshold comparison module 312, wait pattern generator 302, and optionally includes channel deferral signal generator 304. In some embodiments, externals signals are generated by channel deferral signal generator 304, each of which is sampled by command deferral module 214 (FIG. 4) of a respective memory channel to determining whether to defer execution of commands in the command queue (e.g., command queue 150) for that respective memory channel (e.g., Ch 1).

In some embodiments, power monitor 310 obtains a power measurement (e.g., power measurement 311) corresponding to power consumption by storage device 120, or a subsystem of storage device 120. Examples of the subsystem for which power is monitored are described above. Power monitor 310 is optionally implemented using one or more current sensors, current-to-voltage converters, diodes, and/or other passive or active components to measure electrical characteristics of storage device 120 and its components. Optionally, power monitor 310 is a device external to storage device 120. Furthermore, in some embodiments, power measurement 311 is a measure of instantaneous power consumption by a subsystem (e.g., the memory channels of storage device 120, including NVM controllers 130 and NVM devices 140, 142 of the memory channels). Additionally and/or alternatively, power consumption 311 is a measure of average power, equal to the total power consumption by a subsystem over a predetermined time (e.g., average power consumed per second over a 10 second period). In some embodiments, power monitor 310 obtains power measurement 311 in accordance with a power measurement frequency (e.g., power measurement 311 is obtained once every 1 millisecond). In some embodiments, timing characteristics of power usage monitor and staggered wait logic 124 are configured to prevent rapid toggling between deferring and restarting execution of commands in the command queues 150/212 of the respective memory channels.

In some embodiments, power threshold comparison module 312 makes a determination to reduce power consumption (e.g., by outputting or issuing power exceeds threshold flag 313) in accordance with the obtained power measurement signal 311 and one or more power threshold values. In some embodiments, a power threshold value is a limit on instantaneous power consumption or average power consumption over a predefined period of time (e.g., a period of time having a predefined duration between 0.25 second and 10 seconds) by storage device 120 or a subsystem of storage device 120. Specifically, in some embodiments, power threshold comparison module 312 compares one or more power measurements (e.g., power measurement 311) with one or more power threshold values, and produces power exceeds threshold flag 313 if power measurement 311 exceeds a power threshold value. In some embodiments, power threshold comparison module 312 also outputs a second control signal 314 to wait pattern generator 302. In such embodiments, control signal 314 specifies a pattern of wait enable signals to be generated by wait pattern generator 302. For example, in some embodiments in which power threshold comparison module 312 compares power measurement 311 with two or more power thresholds, the second control signal 314 corresponds to the highest power threshold exceeded by power measurement 311, and the wait enable signal pattern generated by wait pattern generator 302 also corresponds to the highest power threshold exceeded by power measurement 311. In a non-limiting example, the second control signal 314 determines the duty cycle of the wait periods 320 (FIG. 3B) in the wait enable signals generated by wait pattern generator 302, and the duty cycle specified by the second control signal 314 is higher, when a higher power threshold is exceeded by power measurement 311, than when power measurement 311 exceeds only a lower power threshold.

In some embodiments, power monitor 310 and power threshold comparison module 312 are implemented in host system 110, external to storage device 120, while wait pattern generator 302 is implemented in storage device 120. In such embodiments, storage device 120 receives one or more control signals (sometimes herein called external signals) produced by power threshold comparison module 312, such as power exceeds threshold flag 313, and optionally second control signal 314.

Wait pattern generator 302 generates wait enable signals 306-1 to 306-M, and is coupled, in some embodiments, to one or more logic gates of channel deferral signal generator 304. Alternatively, wait pattern generator 302 is coupled to command deferral logic 152 or command deferral module 214 in each of the memory channels configured to defer execution of commands in a corresponding command queue based on one or more "external" signals received by those memory channels. In some embodiments, wait pattern generator 302 is circuitry that resides in storage controller 128. In some other embodiments, wait pattern generator 302 is implemented by a set of instructions in one or more programs executed by one or more processors of storage controller 128.

In some embodiments, each of the generated wait enable signals 306 corresponds to a respective memory channel (e.g., Ch 1, Ch 2, etc.), and therefore also corresponds to the respective NVM controller 130 and NVM devices in that memory channel. Each of the wait enable signals has a predefined value (e.g., a logic 1 value) during a wait period (e.g., wait period 320, FIG. 3B). The wait period is the time during which the corresponding command deferral module 214 defers execution of commands in a corresponding command queue 150 if a determination has been made to reduce power consumption by the storage device 120 (e.g., because the power measurement 311 has been determined to exceed a power threshold). In some embodiments, command deferral during the wait period can be overridden by a command in the command queue 150 having a predefined high priority.

Figure 3B:
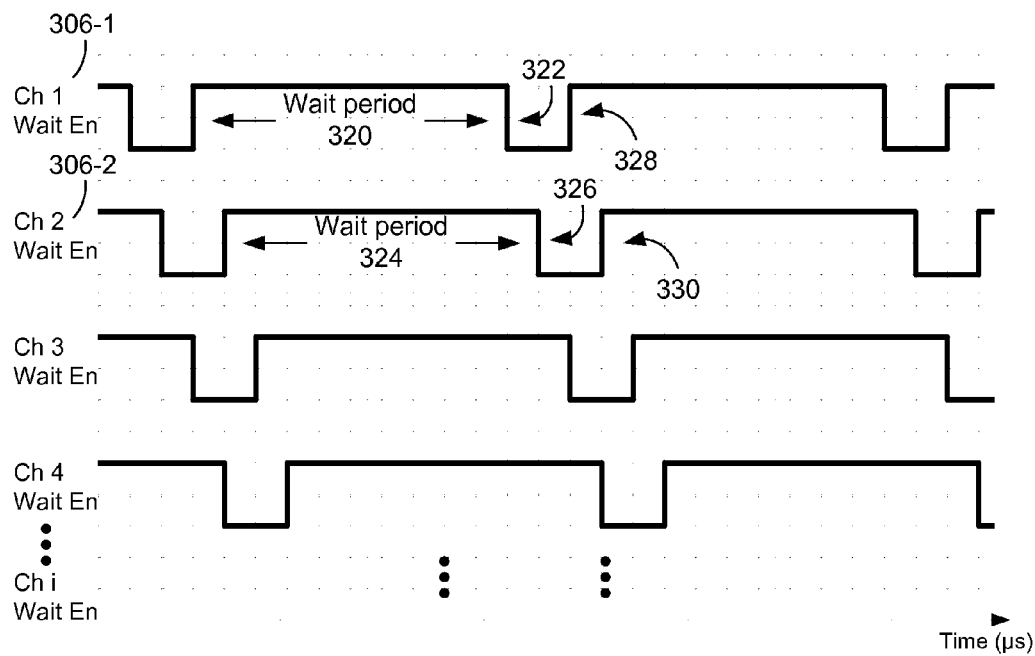
FIG. 3B is a prophetic illustration of multiple wait enable signals corresponding to multiple memory channels, in accordance with some embodiments.

In some embodiments, the wait enable signals are generated so that the memory channels of storage device 120 (e.g., Ch 1, Ch 2) have staggered start times (e.g., 322, 326). An example of this is shown in FIG. 3B. Each start time corresponds to the end of a wait period (e.g., wait period 320, 324) for the corresponding memory channel. Stated another way, the wait periods for the memory channels have staggered end times corresponding to distinct start times. Start times (e.g., start time 322) are the times at which the command deferral modules (e.g., command deferral module 214) restart execution of commands in the respective command queues (e.g., command queue 150).

In some embodiments, the respective wait period (e.g., wait period 320) for a first distinct set of NVM devices (e.g., the NVM devices in a first memory channel) is at least partially non-overlapping with the respective wait period (e.g., wait period 324) for a second distinct set of NVM devices (e.g., the NVM devices in a second memory channel). By generating wait enable signals 306 such that the respective wait periods (e.g., wait periods 320 and 324) are partially non-overlapping, execution of commands in the command queues of the different memory channels are deferred in a staggered manner and resumed in a staggered manner. As a result, power consumption is managed across multiple memory channels and power consumption spikes are reduced.

In some embodiments, each memory channel for which command execution is being deferred (of a set of two or more memory channels for which command execution is being deferred) resumes execution at a different start time than the other memory channels for which command execution is being deferred. In the example shown in FIG. 3B, the start time for memory channel 1 is different from the start time for memory channels 2, 3 and 4. In some other embodiments, two or more memory channels may have the same start time for resuming execution of commands, while at least one other memory channel has a different start time for resuming execution of commands in their respective command queues.

In some embodiments, the wait period (e.g., wait period 320) for each memory channel repeats (i.e., memory channel (s) are held in the WAIT state in a rotating fashion) in accordance with a duty cycle so that no one memory channel is in a persistent WAIT state. Furthermore, in some embodiments, the duty cycle of the wait period for each memory channel corresponds to a priority of the memory channel (e.g., a memory channel with a high priority has a wait period that repeats at a first duty cycle that is lower than the duty cycle of the wait period for another memory channel with a low priority). For example, if memory channel 1 is designated a high priority memory channel, wait period 320 (having a 10 μs duration, for example) repeats, and execution of commands in its command queue 150 is deferred for the wait period once every 50 μs, whereas the wait period 324 for memory channel 2, designated a low priority memory channel, repeats once every 20 μs. In the latter example, the wait period of memory channel 1 has a duty cycle of twenty percent while the wait period of memory channel 2 has a duty cycle of fifty percent.

In some embodiments, the wait period (e.g., wait period 320) for a memory channel has a duration based at least in part on a priority of the corresponding memory channel (e.g., if memory channel is a high priority memory channel, its corresponding wait period has a shorter duration than that of the wait period of another lower priority memory channel). For example, the wait period 320 of a high priority memory channel 1 has a duration of 5 μs, whereas the wait period 324 of a normal priority memory channel 2 has a duration of 15 μs. Effectively, a longer wait period duration increases the time by which the execution of a command is deferred. In some embodiments, both the duration and the duty cycle of the wait period of a corresponding memory channel are based at least in part on the priority of the corresponding memory channel. For example, a high priority memory channel 1 has a short wait period (e.g., 5 μs) that repeats at a low duty cycle (e.g., 5 μs of every 50 μs, which is duty cycle of ten percent), while a normal priority memory channel 2 has a longer wait period (e.g., 15 μs) that repeats at a moderate duty cycle (e.g., 15 μs of every 50 μs, which is duty cycle of thirty percent), such that more commands in the command queue of memory channel 1 can be executed in succession, and the execution of such commands will be deferred for shorter periods of time, than for memory channel 2.

In some embodiments, the wait period and duty cycle of a corresponding memory channel are set in accordance with the power thresholds that have been exceeded by power measurement 311, as determined by power threshold comparison module 312. For example, if there are two or more predefined power thresholds (e.g., power threshold A=3200 milliWatts, and power threshold B=3600 milliWatts), and only the lower power threshold A is exceeded by power measurement 311 (e.g., power measurement 311 is 3225 milliWatts), the wait periods and duty cycles of the wait enable signals for each memory channel are smaller than they would be if both power thresholds A and B are exceeded by power measurement 311. As a result, when both power thresholds are exceeded by power measurement 311, command execution is reduced by a greater degree (e.g., thirty percent) than when only one of the power thresholds is exceeded (e.g., ten percent).

In some embodiments, the power threshold or thresholds are determined based on the number of memory channels and the number of NVM devices per memory channel. For example, in some embodiments, a power threshold of 200 milliWatts per channel is used, where the power measurement is based on power drawn only by the NVM devices, but not any of the support circuitry. In some embodiments, such as embodiments in which the power measurement is performed external to the storage device, the power threshold or thresholds are determined based on power consumption of the entire storage device. In some embodiments, one of the power thresholds is based, at least in part, on the sum of the idle power consumed by the storage device (e.g., 3.0 to 3.5 Watts consumed by the controllers and other support circuitry while no memory read, write and erase operations are being performed) plus a power consumption limit per memory channel multiplied by the number of memory channels. Further, another factor used in determining one or more of the power thresholds in some embodiments is a physical limit on the amount of power that a host system 110 or other system can provide to storage device 120. In some embodiments, the host system 110 has both a peak power limit and a sustained power limit on how much power can be provided to storage device 120, and one or both of these factors is taken into account in setting one or more power thresholds for the power usage monitor and staggered wait logic 124. Furthermore, in some embodiments, the one or more power thresholds are either firmware settable, or are implemented as values stored by storage controller 128 in accordance with one or more commands received from host system 110.

In some embodiments, channel deferral signal generator 304 generates one or more external signals 308 (e.g., Ch 1 Deferral Signal 308-1, Ch 2 Deferral Signal 308-2, . . . Ch M Deferral Signal 308-M) in accordance with a determination to reduce power consumption (e.g., power exceeds threshold flag 313 is produced) and one or more generated wait enable signals (e.g., Ch 1 Wait Enable 306). More specifically, in some embodiments, channel deferral signal generator 304 is implemented with one or more AND gates that produce the one or more external signals when both the wait enable signal (e.g., Ch 1 Wait En 306) is high, and the power threshold comparison module 312 has produced a power exceeds threshold flag 313 (i.e., power measurement 311 exceeds a predefined power threshold value). Thus, for example, Ch 1 Deferral Signal 308-1 is produced as an external signal for deferring execution of commands in command queue 150 (i.e., when Ch 1 Wait En 306-1 is in its wait period 320) when the power exceeds threshold flag 313 is produced. The one or more external signals are sampled by command deferral module 214 (e.g., FIG. 4 (400)), and the execution of commands in the command queues (e.g., command queue 150) of one or more memory channels (e.g., Ch 1) are deferred accordingly.

In some embodiments, the power exceeds threshold flag 313 is produced and provided directly to wait pattern generator 302, which contains logic for generating a set of channel deferral signals for deferring execution of commands, where the one or more externals signals are sampled by command deferral module 214. In these embodiments, channel deferral signal generator 304 is not needed. Furthermore, in these embodiments, the external signals for deferring execution of commands are not generated by wait pattern generator 302 if a determination has not been made to reduce power consumption by the storage device 120 (e.g., because the power measurement 311 has not been determined to exceed a power threshold).

In some embodiments, some or all of power usage monitor and staggered wait logic 124 includes one or more logic gates, shift registers, clocks, flip flops, inverters, and/or other logic elements, where the foregoing elements are implemented with transistors and other active or passive electronic components.

In some embodiments, channel deferral signal generator 304 is implemented in software executed by the NVM controllers 130. More specifically, in some embodiments, the NVM controller 130 for a respective memory channel receives the corresponding wait enable signal from wait pattern generator 302, and also receives the power exceeds threshold flag 313, and executes instructions in one or more programs to combine those signals and thereby produce the deferral signal, or an equivalent control value, for that memory channel.

FIG. 3B is a prophetic illustration of multiple wait enable signals corresponding to multiple memory channels, in accordance with some embodiments. It is noted that the lengths of the various time periods shown in FIG. 3B are not necessarily to scale; in some embodiments the lengths of the time periods and the duty cycle of the wait periods may be substantially different from what is shown in FIG. 3B.

As shown in FIG. 3B, in some embodiments, the wait enable signals 306 of multiple memory channels (e.g., Ch 1 Wait Enable 306-1, Ch 2 Wait Enable 306-2), generated by wait pattern generator 302, have staggered start times (e.g., 322, 326) corresponding to the end of a wait period (e.g., wait period 320, 324) for the corresponding memory channel. Furthermore, as illustrated in FIG. 3B, in some embodiments the respective wait period (e.g., wait period 320) for a first distinct set of NVM devices 140 in at least two distinct sets of NVM devices is at least partially non-overlapping with the respective wait period (e.g., wait period 324) for a second distinct set of NVM devices 140 in the at least two distinct sets.

Figure 4:
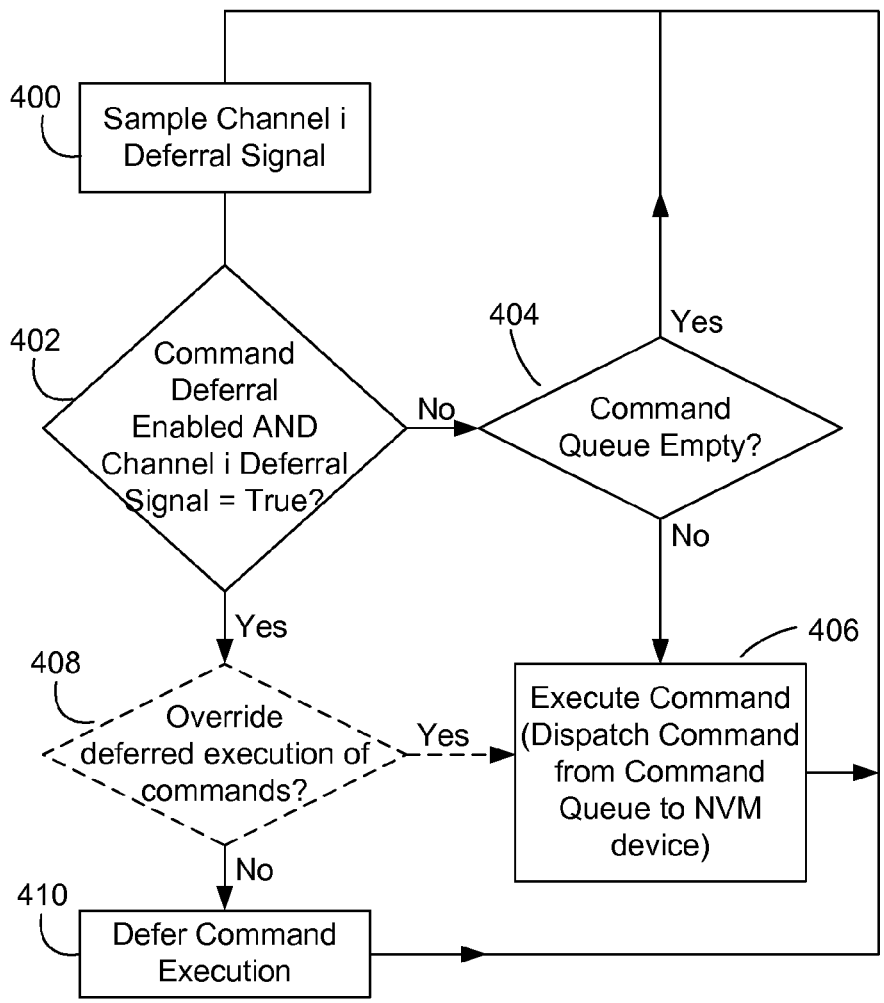
FIG. 4 is a flowchart representation illustrating the operation of a command deferral module, in accordance with some embodiments.
Figure 5D:
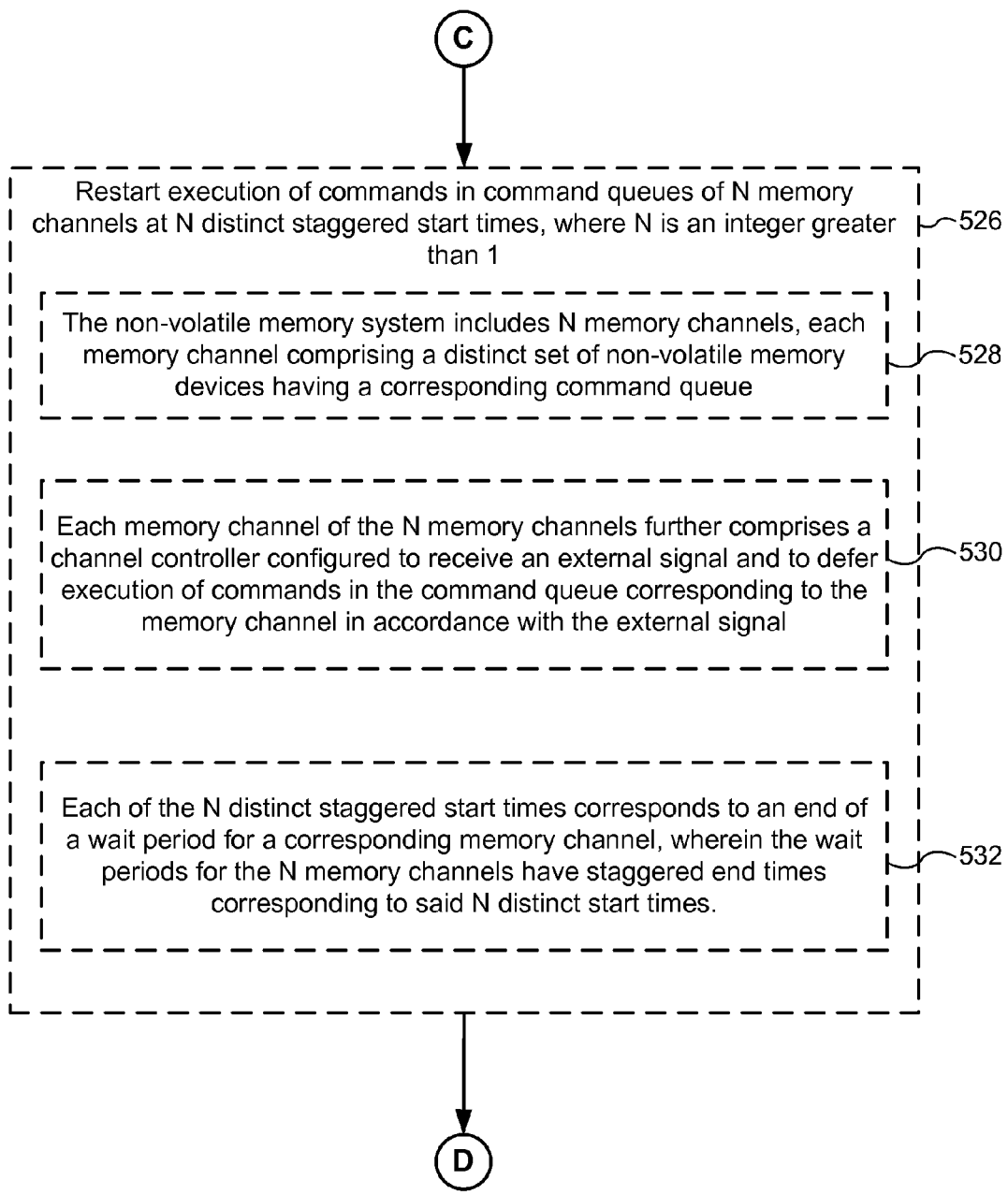
Figure 5E:
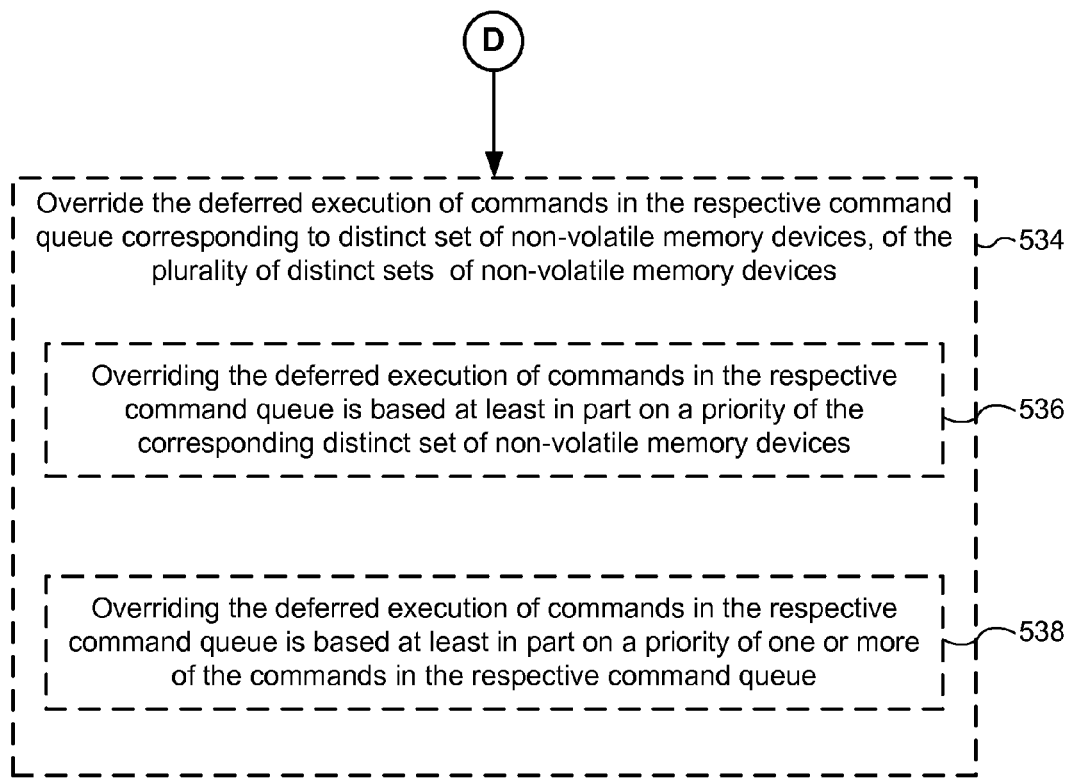

FIG. 4 is a flowchart representation illustrating the operation of a command deferral module 214 for a respective memory channel i, in accordance with some embodiments. As illustrated in FIG. 4, command deferral module 214 determines whether to defer execution of commands in a command queue (e.g., command queue 150) for the respective memory channel i (e.g., Ch 1) in accordance with one or more external signals received by the memory channel's controller.

In some embodiments, command deferral module 214 for memory channel i samples (400) the channel i deferral signal 308-i, sometimes herein called an external signal since it is provided, in some embodiments, by a channel deferral signal generator 304 (FIG. 3A) external to the memory channel. In some embodiments, command deferral module 214 samples a channel deferral signal generated by wait pattern generator 302 (e.g., in embodiments in which an output of power threshold comparison module 312 is received by wait pattern generator 302). As described above, in some other embodiments the channel i deferral signal 308-i sampled at 400 is generated by a program executed by the same NVM controller as the one that includes (or executes) command deferral module 214. However, in those embodiments, the channel i deferral signal 308-i is generated based on one or more external signals, such as channel i wait signal 306-i and power exceeds threshold flag 313.

Next, in some embodiments, command deferral module 214 determines (402), in accordance with the sampled channel i deferral signal 308-i, whether deferring execution of commands in the command queue 150 for memory channel i is currently enabled. In some embodiments, this determination is based solely on the state or value of the sampled channel i deferral signal 308-i (e.g., a determination of whether the sampled channel i deferral signal 308-I=TRUE), while in other embodiments this determination is based on both the state or value of the sampled channel i deferral signal 308-i and another signal or value (e.g., power exceeds threshold flag 313, or a mode setting for the memory channel or a mode setting for the entire storage device) that indicates whether the command deferral feature is enabled.

If deferring execution of commands in a respective command queue is not currently enabled (402—No), command deferral module 214 then determines (404) whether the command queue 150 for the respective memory channel is empty. If the respective command queue is empty (404—Yes), then command deferral module 214 continues to sample (400) the channel i deferral signal 308-i. On the other hand, if the respective command queue is not empty (404—No), a command in the respective command queue is executed (406) (e.g., by command executor 154, which dispatches a command from the command queue to the one or more NVM devices to which the command is directed).

If deferring execution of commands in a respective command queue is currently enabled (402—Yes), then command deferral module 214 determines (408) whether to override the deferred execution of commands in the respective command queue. In some embodiments, overriding the deferred execution of commands in a respective command queue is based at least in part on a priority (e.g., a priority setting) of the corresponding memory channel, or equivalently, priority of the distinct set of non-volatile memory devices in the corresponding memory channel. For example, if memory channel 1 is a high priority memory channel, command deferral module 214 may be configured such that commands in the command queue of memory channel 1 cannot be deferred, and must always be executed without delay. It is noted that a memory channel may be designated as a high priority memory channel if, for example, commands in its command queue involve operating on user data that is deemed critical. In some embodiments, storage device 120 is configured to designate one or more memory channels as high priority memory channels in accordance with commands (e.g., configuration setting commands) received from a host computer system 110.

In some embodiments, the presence of one or more high priority instructions or commands in a command queue overrides the deferred execution of commands in that command queue. To utilize this feature, the host system 110 sends one or more high priority commands to the storage device 120, which are placed in respective command queues for one or more memory channels by the storage device 120 (e.g., by storage controller 128). In some embodiments, so long as at least one high priority instruction or command is present in the respective command queue for a memory channel, any deferral of execution of command in that command queue is overridden. In some embodiments, any high priority instructions or commands in a respective command queue are executed (e.g., dispatched to one or more NVM devices for execution) first, before any lower priority instructions or command in the respective command queue are executed.

In some embodiments, deferring execution of a particular command is performed in accordance with the power consumption of the command type of the particular command. For example, in some embodiments, storage device 120 consumes less power in executing a read command than in executing a write command or erase command. In this example, when a "read" command is the next command in the command queue 150 of a respective memory channel, the NVM controller 130 for that memory channel overrides the deferred execution of commands in the respective command queue, enabling the read command to be executed even though command deferral is enabled (402—Yes).

If command deferral module 214 overrides (408—Yes) the deferred execution of commands in the respective command queue, then execution of commands in the respective command queue is not deferred, and one or more commands in the respective command are executed (e.g., by command executor 154, or command execution module 216, which dispatches the command(s) to one or more NVM devices for execution). In some embodiments, a single command is executed upon the making of this determination (408—Yes), and then the process repeats starting at operation 400, to determine whether to execute a next command, if any, in the respective command queue.

On the other hand, if command deferral module 214 does not override (408—No) the one or more external signals, then execution of commands in the respective command queue is deferred (410), and command deferral module 214 repeats the process described above, starting with once again sampling (400) the channel i deferral signal.

FIGS. 5A-5E illustrate a flowchart representation of a method 500 of deferring execution of commands in the command queues of at least memory channels, in accordance with some embodiments. A non-volatile memory system (e.g., storage device 120, FIG. 1), which includes a plurality of distinct sets of non-volatile memory devices (e.g., NVM devices 140-1 through 140-n, and NVM 142-1 through 142-k), coordinates and manages multiple subsystem components to defer execution of commands in the command queue corresponding to at least two distinct sets of non-volatile memory devices.

A non-volatile memory system (e.g., storage device 120), in accordance with a determination to reduce power consumption by the non-volatile memory system, and for each of at least two distinct sets of the plurality of distinct sets of non-volatile memory devices, defers (502) execution of commands in a command queue corresponding to the distinct set of non-volatile memory devices during a respective wait period. The respective wait period for a first distinct set of non-volatile memory devices in the at least two distinct sets is at least partially non-overlapping (504) with the respective wait period for a second distinct set of non-volatile memory devices in the at least two distinct sets. In some embodiments, wait pattern generator 302 generates wait enable signals 306 (e.g., Ch 1 Wait Enable 306-1, Ch 2 Wait Enable 306-2), each including a respective wait period (e.g., wait period 320, 324, FIG. 3B). Because the respective wait periods (e.g., wait periods 320 and 324) are partially non-overlapping, execution of commands in the command queue (e.g., command queue 150) are deferred in a staggered manner, and power consumption is managed across memory channels to reduce power consumption spikes.

In some embodiments, each of the plurality of distinct sets of non-volatile memory devices comprises a memory channel (506) that also includes a corresponding channel controller, and the command queue corresponding to the distinct set of non-volatile memory devices in the memory channel comprises a command queue for the memory channel.

Furthermore, in some embodiments, the channel controller for a respective memory channel (e.g., memory channel i) determines (508) whether to defer execution of commands in the command queue for the respective memory channel in accordance with an external signal received by the channel controller. In some embodiments, the aforementioned external signal is the channel deferral signal 308-i described above with reference to FIG. 3A. In some embodiments, the aforementioned external signal is a signal (e.g., power exceeds threshold flag 313) that indicates that a current power measurement exceeds one or more power thresholds. See also the discussion above of operations 400 and 402 of the flowchart representation illustrating the operation of a command deferral module.

In some embodiments, the non-volatile memory system (e.g., storage device 120) includes M memory channels (510), where M is an integer greater than 1, each memory channel including a distinct set of non-volatile memory devices having a corresponding command queue and wait period. In some embodiments, the wait period for each memory channel of the M memory channels repeats (512) in accordance with a duty cycle corresponding to a priority of the memory channel. As a result, no one memory channel is in a persistent WAIT state. Furthermore, in some embodiments, the duty cycle corresponds to a priority of the memory channel (e.g., a memory channel with a high priority has a wait period that repeats at a low duty cycle).

In some embodiments, the wait period for each memory channel of the M memory channels has a duration (514) based at least in part on a priority of the corresponding memory channel. Examples of this are discussed above with reference to FIGS. 3A and 3B. In some embodiments, both the duration and the duty cycle of the wait period (e.g., wait period 320, FIG. 3B) of a corresponding memory channel are based at least in part on the priority of the corresponding memory channel. Furthermore, in some embodiments, the wait period and duty cycle of a corresponding memory channel are set in accordance with one or more power threshold values that have been exceeded, as determined by power threshold comparison module 312.

In some embodiments, a power measurement corresponding to power consumption by a subsystem is obtained (516), wherein the subsystem includes the plurality of distinct sets of non-volatile memory devices. Examples of such a subsystem are described above with reference to FIG. 1. In some embodiments, the power measurement corresponding to power consumption by a subsystem is obtained by a power usage monitor such as power usage monitor and staggered wait logic 124, described above with reference to FIG. 3A.

In some embodiments, the power measurement is a measure of instantaneous power consumption (518) by the subsystem. Additionally and/or alternatively, power consumption 311 is a measure of average power consumption by the subsystem, equal to the total power consumption by the subsystem over a predetermined time (e.g., average power consumed per second over a 10 second period). Furthermore, in some embodiments, the power measurement is received from a device external (520) to the non-volatile memory system. Furthermore, in some embodiments, the power measurement is obtained in accordance with a power measurement frequency (522).

Further, in some embodiments, the determination to reduce power consumption by the non-volatile memory system is made (524) in accordance with the obtained power measurement and one or more power thresholds. Power threshold comparison module 312 makes the determination to reduce power consumption (e.g., power exceeds threshold flag 313) in accordance with the obtained power measurement signal 311 and one or more power thresholds (sometimes called power threshold values). In some embodiments, a power threshold is a limit on instantaneous power consumption (e.g., a limit on peak power consumption of 3200 milliWatts by the NVM devices in the storage device), and/or a limit on average power equal to the total power consumption by the subsystem over a predetermined time (e.g., a limit of 3200 milliWatts consumed per second, on average, over a 10 second period). Specifically, in some embodiments, power threshold comparison module 312 compares one or more power measurements (e.g., power measurement 311) with one or more power thresholds, and produces power exceeds threshold flag 313 if power measurement 311 exceeds a power threshold. In some embodiments, power threshold comparison module 312 sets power exceeds threshold flag 313 to a first predefined value (e.g., "true" or 1) if power measurement 311 exceeds a power threshold, and sets power exceeds threshold flag 313 to a second predefined value (e.g., "false" or 0) if power measurement 311 does not exceed a power threshold.

In some embodiments, execution of commands is restarted (526) in command queues of M memory channels at M distinct, staggered start times, where M is an integer greater than 1. Furthermore, in some embodiments, the non-volatile memory system includes M memory channels (528), each memory channel comprising a distinct set of non-volatile memory devices having a corresponding command queue. In some further embodiments, each memory channel of the M memory channels further comprises a channel controller configured (530) to receive an external signal and to defer execution of commands in the command queue corresponding to the memory channel in accordance with the external signal. In some embodiments, each of the M distinct staggered start times corresponds to an end of a wait period (532) for a corresponding memory channel, wherein the wait periods for the M memory channels have distinct, staggered end times corresponding to said M distinct start times.

Optionally, in some embodiments, the method includes overriding (534) the deferred execution of commands in the respective command queue corresponding to a distinct set of non-volatile memory devices of the plurality of distinct sets of non-volatile memory devices. In some embodiments, overriding the deferred execution of commands in the respective command queue is based at least in part on a priority (536) of the corresponding distinct set of non-volatile memory devices. For example, if a respective memory channel is a high priority memory channel, command deferral module 214 for that memory channel is configured to continue executing commands in the command queue for the respective memory channel, without delay, even when the channel deferral signal 308 for the respective memory channel indicates that deferring execution of commands in the command queue 150 for the respective memory channel is enabled. Further discussion of overriding deferred execution of commands based on memory channel priority can be found above, with respect to operation 408 in FIG. 4.

Furthermore, in some embodiments, overriding the deferred execution of commands in the respective command queue is based at least in part on a priority (538) of one or more of the commands in the respective command queue. Further discussion of overriding deferred execution of commands based on priority of one or more command in the respective command queue can be found above, with respect to operation 408 in FIG. 4.

In some embodiments, with respect to any of the methods described above, the storage device includes (1) an interface for coupling the storage device to a host system, (2) a plurality of non-volatile memory controllers, each controller of the plurality of controllers configured to defer execution of commands in one or more command queues managed by controller, and (3) a plurality of distinct sets of non-volatile memory devices, each controlled by a corresponding one of the non-volatile memory controllers.

Figure 6:
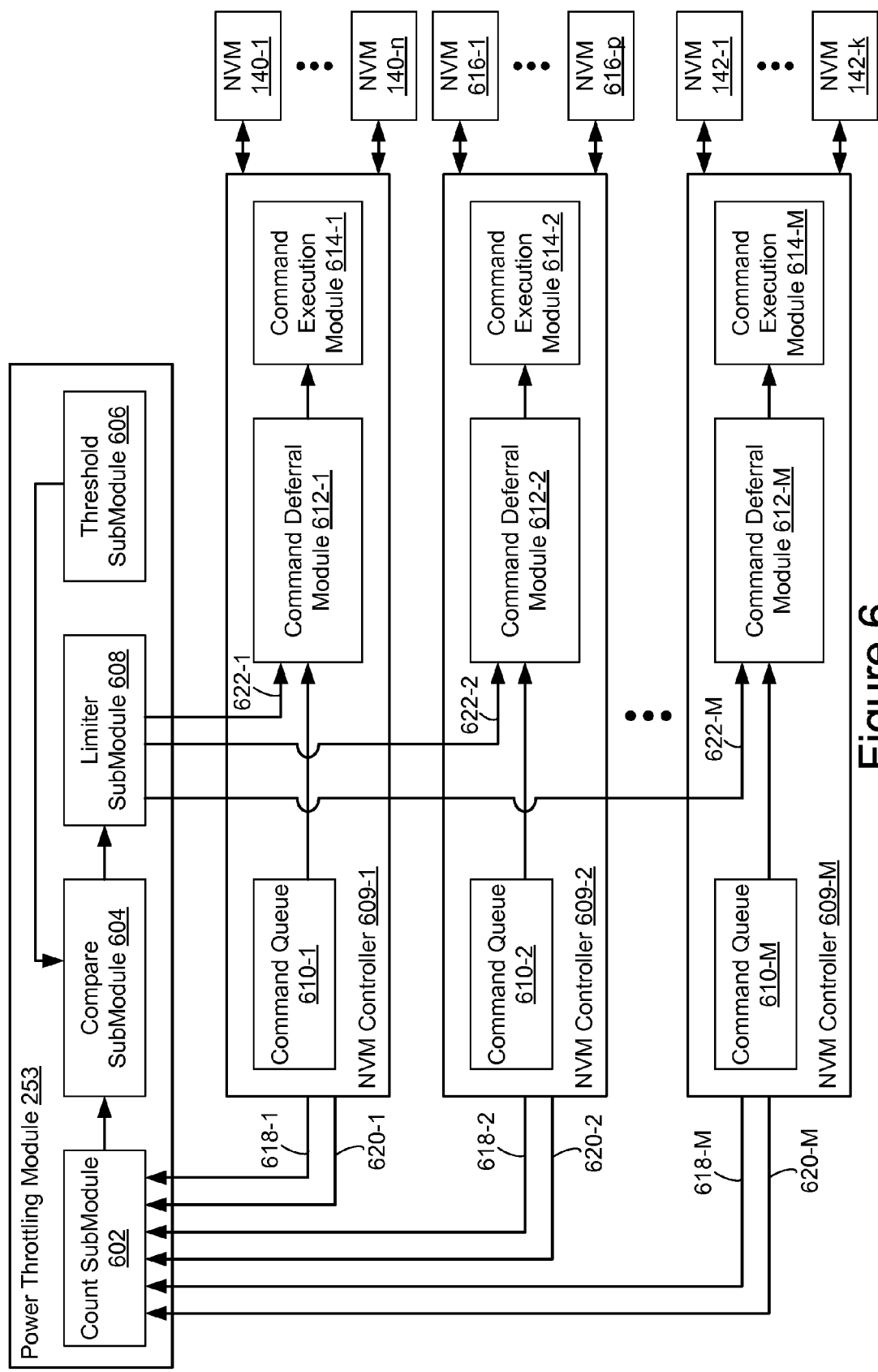
FIG. 6 is a block diagram illustrating an implementation of a power throttling module, in accordance with some embodiments.

FIG. 6 is a block diagram illustrating an implementation of power throttling module 253 and NVM controllers 609, in accordance with some embodiments. While some example features are illustrated, various other features have not been illustrated for the sake of brevity and so as not to obscure pertinent aspects of the example embodiments disclosed herein. Power throttling module 253 typically includes count submodule 602, compare submodule 604, limiter submodule 608, and threshold submodule 606. In some embodiments, power throttling module 253 is used in place of power usage monitor and staggered wait logic 124 (FIG. 1). In some embodiments, power throttling module 253, or portions thereof, are components of storage device controller 128. In some embodiments, portions of power throttling module 253 (e.g., limiter submodule 608, compare submodule 604, and/or count submodule 602) are components of NVM controllers 609. For example, in accordance with some embodiments, each NVM controller 609 includes a limiter module, compare module, and/or count module that functions similarly to the respective submodule in power throttling module 253 as described below.

Count submodule 602 is coupled to a plurality of memory controllers via communication lines 618 and 620. Count submodule 602 counts the number of active memory commands in the plurality of corresponding memory controllers (e.g., NVM controllers 609). Count submodule 602 increments the count of active memory commands in response to receiving a command start notification via a particular communication line 618. Count submodule 602 decrements the count of active memory commands in response to receiving a command complete notification via a particular communication line 620. In some embodiments, count submodule 602 includes an accumulator. In some embodiments, count submodule 602 performs a weighted count of active memory commands, as described in more detail below. In some embodiments, count submodule 602 receives a command start notification and a respective command type and count submodule 602 increments the count by a weight corresponding to the respective command type. In some embodiments, count submodule 602 receives a command complete notification and a respective command type and count submodule 602 decrements the count by a weight corresponding to the respective command type.

In some embodiments, a weight is assigned to a respective memory command type based on an estimated completion time for the memory command type (e.g., an estimate based on the average time to complete for commands of the respective type). For example, in accordance with some embodiments, the fastest memory command type is assigned a weight of one and all other memory command types are assigned integral multiples of the weight based on their respective completion times relative to the completion time of the fastest memory command type. In some embodiments, the assigned weights are based on an estimate of the power consumed during execution of a command of the corresponding command type. In some embodiments, the assigned weights are based on an average power consumed during execution of a command of the corresponding command type.

As a non-limiting example, Table 1, below, shows various memory commands types, each with a respective estimated completion time and a respective assigned weight.

TABLE 1

| Memory Command Type | Estimated Completion Time | Assigned Weight |
|---|---|---|
| SLC Read | 36 μs | 1 |
| SLC Program | 323 μs | 9 |
| SLC Erase | 2716 μs | 76 |
| MLC Read LP | 36 μs | 1 |
| MLC Read UP | 51 μs | 2 |
| MLC Program LP | 432 μs | 12 |
| MLC Program UP | 2100 μs | 64 |
| MLC Erase | 3372 μs | 106 |

As shown in Table 1, a single-level cell (SLC) read command type takes an estimated 36 μs (microseconds) to complete and is thus the fastest memory command type and is assigned a weight of one. A lower page (LP) multi-level cell (MLC) read command type also takes an estimated 36 μs to complete and is therefore also assigned a weight of one. An upper page (UP) MLC read command type takes an estimated 51 μs to complete and is therefore assigned a weight of two. An MLC erase command takes an estimated 3372 μs to complete and is therefore assigned a weight of 106. In some embodiments, the assigned weights are stored in count submodule 602. In some embodiments, the assigned weights are stored in power throttling module 253. In some embodiments, the assigned weights are stored in storage controller 128 (e.g., in memory 254, FIG. 2B).

Compare submodule 604 compares a count value received from count submodule 602 with one or more power threshold values received from threshold submodule 606. In some embodiments, compare submodule 604 includes a comparator. In some embodiments, different thresholds are used depending on the mode of operation of the storage device (e.g., storage device 120, FIG. 1). For example, in accordance with some embodiments, a higher threshold is used during a start-up mode of operation than during a normal mode of operation for the storage device. In some embodiments, the one or more power thresholds are based on one or more parameters received from a host system (e.g., computer system 110, FIG. 1).

Threshold submodule 606 adjusts one or more thresholds corresponding to one or more power consumption limits for storage device 120. In some embodiments, threshold submodule 606 adjusts one or more of the thresholds based on one or more of the following: (1) a measure of heat (e.g., a measurement of case temperature of a case of the storage system, and/or a measurement of flash die temperature measured at one or more of NVM devices 140, 142) associated with the storage device; (2) a measure of a current drawn by the storage device; (3) a measure of power consumption of the storage device; (4) one or more parameters received from a host system (e.g., computer system 110, FIG. 1); or (5) a mode of operation of storage device 120. In some embodiments, storage device 120's modes of operation include one or more of: (1) a formatting mode; (2) a power failure mode; (3) a start-up mode; (4) one or more host-specified power modes; and (5) a normal operating mode. In some embodiments, threshold submodule 606 generates one or more of the thresholds. In some embodiments, threshold submodule 606 receives one or more of the thresholds from a different component of storage device 120 (e.g., storage controller 128, FIG. 1). In some embodiments, threshold submodule 606 is coupled to other components of storage system 100 via one or more communication lines (not shown). In some embodiments, threshold submodule 606 receives one or more of the thresholds from a host system (e.g., computer system 110, FIG. 1).

In accordance with an output of compare submodule 604, limiter submodule 608 generates command deferral signals 622 to defer execution of pending commands by NVM controllers 609 (e.g., NVM controller 609-1 through 609-M). In some embodiments, compare submodule 604 generates command deferral signals 622 in a similar fashion as wait enable signals 306 described above with reference to FIGS. 3A-3B. In some embodiments, limiter submodule 608 includes a round-robin limiter. In some embodiments, limiter submodule 608 includes wait pattern generator 302 (FIG. 3A).

In some embodiments, power throttling module 253 includes circuitry (e.g., within threshold submodule 606) for measuring and monitoring power consumption by storage device 120 or by a subsystem of storage device 120. In some embodiments, power throttling module 253 includes circuitry (e.g., within threshold submodule 606) for measuring and monitoring heat generated by storage device 120 or by a subsystem of storage device 120. In some embodiments, power throttling module 253 includes circuitry (e.g., within threshold submodule 606) for measuring and monitoring current drawn by storage device 120 or by a subsystem of storage device 120.

Each non-volatile memory (NVM) controller 609 in FIG. 6 controls a respective set of NVM devices. NVM controller 609-1 controls non-volatile memories 140 (e.g., NVM devices 140-1 through 104-n). NVM controller 609-2 controls non-volatile memories 616 (e.g., NVM device 616-1 through NVM device 616-p). NVM controller 609-M controls non-volatile memories 142 (e.g., NVM 142-1 through NVM 142-k).

A particular NVM controller 609 typically includes a command queue, a command deferral module, and a command execution module. For example, NVM controller 609-1 includes command queue 610-1, command deferral module 612-1, and command execution module 614-1. Command queue 610 contains a queue of pending commands to be performed on the non-volatile memory associated with a particular controller. In some embodiments, command queue 610 includes command queue 150 (FIG. 1). Command deferral module 612, in conjunction with limiter submodule 608, defers execution of commands in command queue 610. In some embodiments, command deferral module 612 includes command deferral logic 152 (FIG. 1). In some embodiments, command deferral module 612 comprises an AND logic gate to perform a logical AND between a respective deferral signal 622 and a signal received from command queue 610 (e.g., a signal notifying command deferral module 612 that a memory command is pending in command queue 610). Command execution module 614 executes memory commands for the associated non-volatile memories (e.g., command execution module 614-1 executes commands for NVMs 140). In some embodiments, command execution module 614, in conjunction with command deferral module 612, defers and/or restarts execution of pending memory commands. In some embodiments, command deferral module 612 includes command executor 154 (FIG. 1).

A particular NVM controller 609 is coupled to power throttling module 253 via communication lines 618 and 620. Command start notifications are sent from the NVM controller 609 to power throttling module 253 (e.g., count submodule 602 within power throttling module 253) via communication line 618. Command complete notifications are sent from the NVM controller 609 to power throttling module 253 (e.g., count submodule 602 within power throttling module 253) via communication line 620. In some embodiments, command start notifications and command complete notifications are generated by the respective command execution module 614 (e.g., command execution module 614-1). In some embodiments, command start notifications and command complete notifications are generated by a respective command queue 610 (e.g., command queue 610-1). In some embodiments, command start notifications and command complete notifications are generated by a respective command deferral module 612 (e.g., command deferral module 612-1). In some embodiments, command start notifications are generated by a first component and command complete notifications are generated by a second component, distinct from the first. In some embodiments, a particular NVM controller 609 is coupled to power throttling module 253 via one or more additional communication lines (not shown) to enable communication of additional information such as command type information and/or command type weight information.

Although FIG. 6 shows power throttling module 253 and NVM controllers 609, FIG. 6 is intended more as a functional description of the various features which may be present in a power throttling module and a NVM controller than as a structural schematic of the embodiments described herein. In practice, and as recognized by those of ordinary skill in the art, items shown separately could be combined and some items could be separated.

Figure 7A:
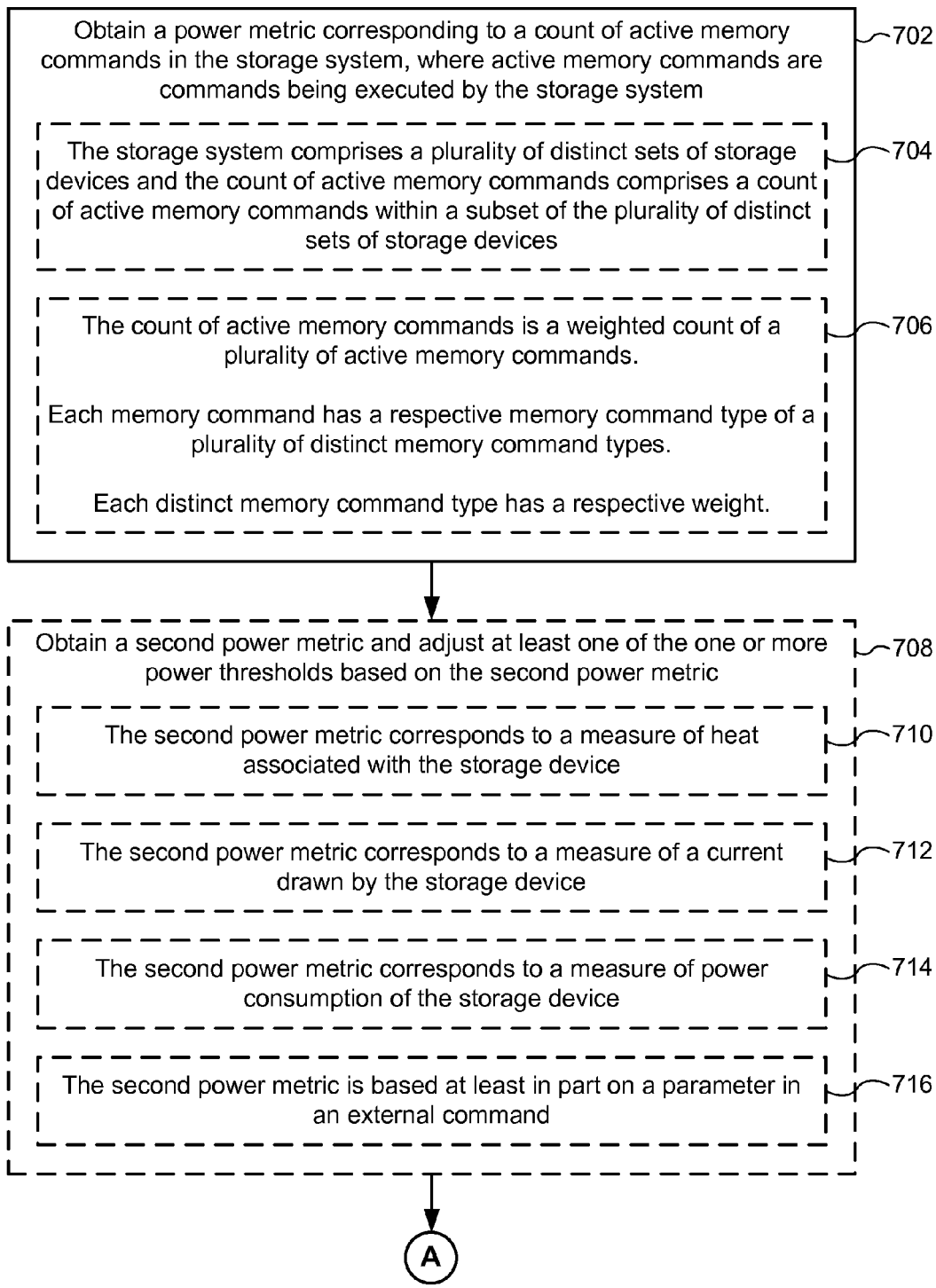
FIGS. 7A-7B illustrate a flowchart representation of a method of operation in a storage system, in accordance with some embodiments.
Figure 7B:
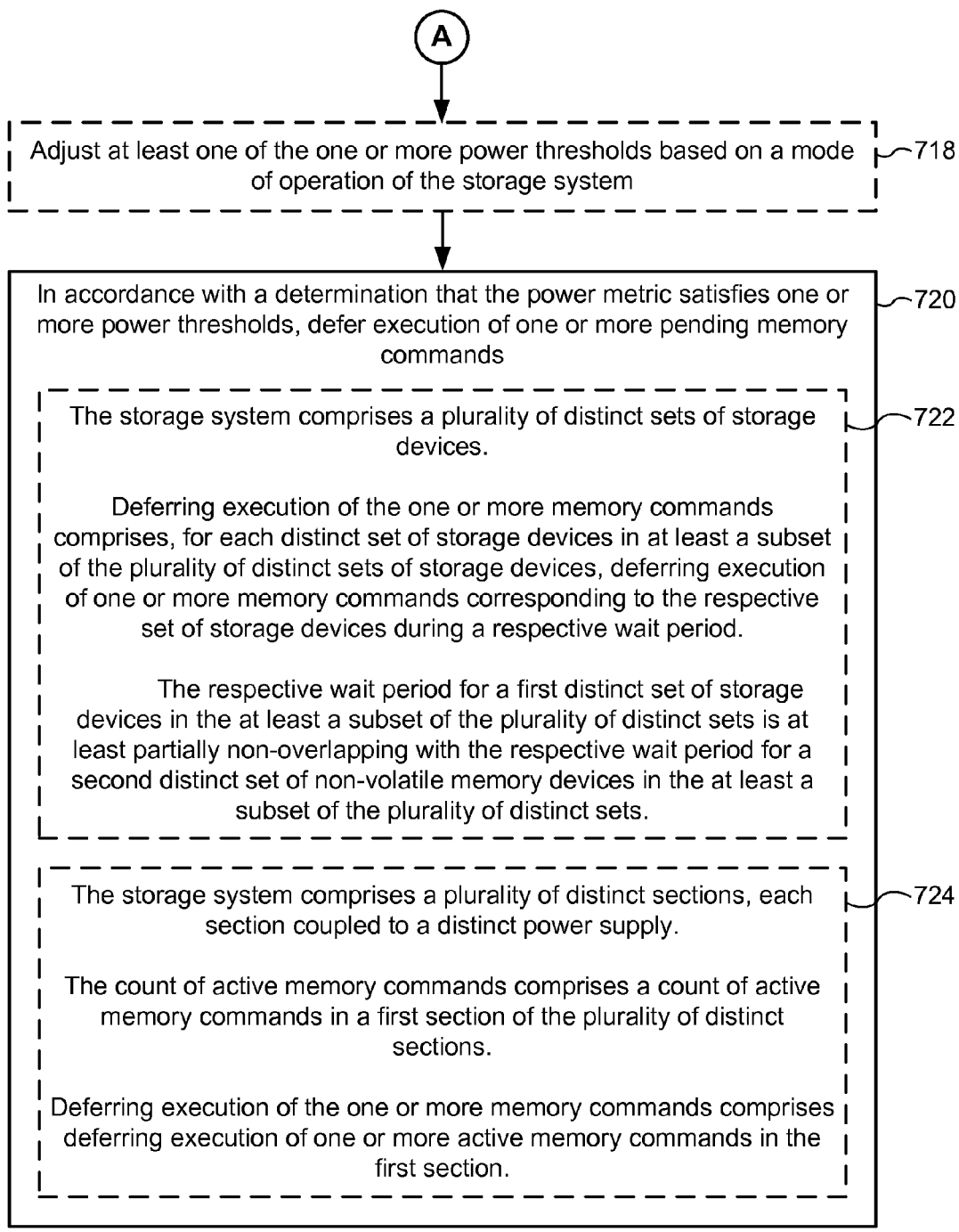

FIGS. 7A-7B illustrate a flowchart representation of method 700 of power management in a storage system, in accordance with some embodiments. In some embodiments, the storage system includes a storage device. In some embodiments, the storage device (e.g., storage device 120, FIG. 1) coordinates and manages multiple sub-system components to manage power, which initiates performance of method 700. At least in some embodiments, method 700 is performed by a storage device (e.g., storage device 120, FIG. 1) or one or more components of the storage device (e.g., storage device controller 128 and/or power throttling module 253, FIG. 2B). In some embodiments, method 700 is governed by instructions that are stored in a non-transitory computer readable storage medium and that are executed by one or more processors of a device, such as the one or more processors 250 of storage device controller 128 and/or the one or more processors 202 of a respective NVM controller 130, as shown in FIGS. 2A-2B. As described below, method 700 provides a more accurate and dynamic way to manage power consumption in a storage system.

The storage system obtains (702) a power metric corresponding to a count of active memory commands in the storage system, where active memory commands are commands being executed by the storage system. For example, in accordance with some embodiments, the active memory commands are commands that have been executed by one of the command execution modules 614 in FIG. 6, but have not yet completed. In some embodiments, an active command is a command for which the power throttling module (e.g., power throttling module 253 in FIG. 6) has received a corresponding command start notification, but has not received a corresponding command complete notification.

In some embodiments, the storage system comprises (704) a plurality of distinct sets of storage devices and the count of active memory commands comprises a count of active memory commands within a subset of the plurality of distinct sets of storage devices. In some embodiments, power throttling is performed on only a subset of the plurality of distinct sets of storage devices and the count of active memory commands includes only active memory commands within the subset. In some embodiments, one or more sets of storage devices are designated as high priority and are not power limited (e.g., included in any power throttling operations). In some embodiments, the storage system comprises a plurality of power throttling modules, each power throttling module coupled to a distinct subset of the plurality of distinct sets of storage devices; and each power throttling module counts only the active memory commands within the coupled respective subset. In some embodiments, each distinct set of storage devices comprises a memory channel.

In some embodiments, (1) the count of active memory commands is (706) a weighted count of a plurality of active memory commands; (2) each memory command has a respective memory command type of a plurality of distinct memory command types; and (3) each distinct memory command type has a respective weight. In some embodiments, the command types include: a read command, one or more types of program commands, a transfer command, and an erase command. For example, Table 1, above, lists various memory command types and assigned weights for each. In some embodiments, a respective weight is assigned to a corresponding command type based on an estimate of the power consumed during execution of a command of that type. In some embodiments, a respective weight is assigned to a corresponding command type based on an estimate of the completion time for a command of that type. For example, in accordance with some embodiments, power throttling module 253 (e.g., count submodule 602) in FIG. 6 receives a command start notification including a corresponding command type and increments the weighted count of active memory commands by the assigned weight of the corresponding command type. In accordance with some embodiments, power throttling module 253 (e.g., count submodule 602) in FIG. 6 receives a command complete notification including a corresponding command type and decrements the weighted count of active memory commands by the assigned weight of the corresponding command type.

In some embodiments, the storage system obtains (708) a second power metric (examples of which are described below) and adjusts at least one of the one or more power thresholds based on the second power metric. For example, in accordance with some embodiments, power throttling module 253 (e.g., threshold submodule 606) in FIG. 6 obtains a second power metric and adjusts at least one of the one or more power thresholds based on the second power metric. In some embodiments, the power throttling module, or a component thereof, generates the second power metric. In some embodiments, the power throttling module, or a component thereof, receives the second power metric from an external source (e.g., a separate component of storage system 100, FIG. 1).

In some embodiments, the second power metric corresponds to (710) a measure of heat associated with the storage device. For example, in accordance with some embodiments, power throttling module 253 (e.g., threshold submodule 606) in FIG. 6 obtains a measurement of the heat associated with storage device 120 and generates the second power metric based on the measurement of heat. In some embodiments, the power throttling module obtains the heat measurement from an external source (e.g., a separate component of storage system 100, FIG. 1).

In some embodiments, the second power metric corresponds to (712) a measure of a current drawn by the storage device. For example, in accordance with some embodiments, power throttling module 253 (e.g., threshold submodule 606) in FIG. 6 obtains a measure of a current drawn by storage device 120 and generates the second power metric based on the current measurement. In some embodiments, the power throttling module obtains the current measurement from an external source (e.g., a separate component of storage system 100, FIG. 1). In some embodiments, the current measurement corresponds to a current through the storage device's host interface (e.g., host interface 122).

In some embodiments, the second power metric corresponds to (714) a measure of power consumption of the storage device. In some embodiments, the measure of power consumption corresponds to instantaneous power. In some embodiments, the measure of power consumption corresponds to an average power. For example, in accordance with some embodiments, power throttling module 253 (e.g., threshold submodule 606) in FIG. 6 obtains a measure of power consumed by storage device 120 and generates the second power metric based on the power measurement. In some embodiments, the power throttling module obtains the power measurement from an external source (e.g., a separate component of storage system 100, FIG. 1).

In some embodiments, the second power metric is based (716) at least in part on a parameter in an external command (e.g., a command from a host system). In some embodiments, the second power metric is based on a parameter that corresponds to one or more of: a heat measurement, a current measurement, or a power measurement. In some embodiments, the external command is generated by a separate component of the storage system. For example, in accordance with some embodiments, computer system 110 in FIG. 1: (1) obtains a heat measurement, a current measurement, and/or a power measurement; (2) generates a parameter corresponding to the obtained measurement(s); and (3) sends the parameter to storage device 120 via control line 111 (e.g., as part of a host command).

In some embodiments, the storage system adjusts (718) at least one of the one or more power thresholds based on a mode of operation of the storage system. In some embodiments, the storage system operates in the following modes: normal operation mode, formatting mode, power failure mode, drive start-up mode, and one or more host-requested power level mode(s).

As used herein, "normal" operating mode, also sometimes called "standard" operating mode, is a mode of operation of the storage device in which the storage system is being used for its intended purposes (e.g., to read and write data) by a host system (e.g., computer system 110, FIG. 1). For example, in normal operating mode, the storage device is receiving and responding to commands sent from a host system. Normal operating mode is distinguished from a formatting mode where the storage device is formatting the non-volatile memory (e.g., erasing the non-volatile memory) rather than reading and writing data received from a host system. In some instances, the storage device operates in formatting mode during a portion of the manufacturing process for the storage device (e.g., prior to being coupled to a host system). Normal operating mode is also distinguished from a power fail mode where the storage device is hardening data and/or resetting controllers rather than receiving and responding to commands sent from a host system. Normal operating mode is further distinguished from drive start-up mode where the drive is powering up, initializing various components (e.g., charging a energy storage device, such as a set of capacitors, that provides power during power fail operations), and/or generating metadata corresponding to the non-volatile memory (e.g., generating logical-to-physical memory maps). In some instances, a storage system that includes multiple storage devices will stagger the power up process so that all of the storage devices are not powered up simultaneously. In these instances, each individual storage device may consume larger amounts of power (e.g., consume more power in start-up mode than in normal operating mode) without exceeding a power threshold corresponding to power consumption for the entire storage system. Normal operating mode is further distinguished from one or more host-requested power level mode(s) where the host applies one or more additional constraints on the power consumption of the storage device. In some embodiments, in a host-requested power level mode, one or more power thresholds are explicitly set by the host system. For example, in accordance with some embodiments, computer system 110 in FIG. 1 requests that storage device 120 operate in a lower power mode (e.g., consume less power than in normal operating mode) and power throttling module 253 (e.g., threshold submodule 606) in FIG. 6 adjusts one or more power thresholds based on the lower power mode of operation of storage device 120.

In accordance with a determination that the power metric satisfies one or more power thresholds, the storage system defers (720) execution of one or more pending memory commands. In some embodiments, a storage controller (e.g., storage controller 128, FIG. 1) determines whether the power metric satisfies one or more power thresholds. In some embodiments, a power throttling module (e.g., power throttling module 253, FIG. 6) determines whether power metric satisfies one or more power thresholds. In some embodiments, the one or more pending memory commands are represented by entries in one or more command queues. For example, in accordance with some embodiments, power throttling module 253 (e.g., limiter submodule 608) in FIG. 6 sends command deferral signals 622 to NVM controllers 609 (e.g., command deferral modules 612) and each NVM controller 609 defers execution of pending commands (e.g., commands with representations stored in a respective command queue 610) in accordance with the received command deferral signal.

In some embodiments, (1) the storage system comprises (722) a plurality of distinct sets of storage devices; (2) deferring execution of the one or more memory commands comprises, for each distinct set of storage devices in at least a subset of the plurality of distinct sets of storage devices, deferring execution of one or more memory commands corresponding to the respective set of storage devices during a respective wait period; and (3) the respective wait period for a first distinct set of storage devices in the at least a subset of the plurality of distinct sets is at least partially non-overlapping with the respective wait period for a second distinct set of non-volatile memory devices in the at least a subset of the plurality of distinct sets. In some embodiments, each distinct set of storage devices is a distinct memory channel. In some embodiments, a storage controller (e.g., storage controller 128, FIG. 1) determines the respective wait periods. In some embodiments, a power throttling module (e.g., power throttling module 253, FIG. 6), or a component thereof, determines the respective wait periods. For additional details regarding the respective wait periods, refer to the discussion of method 500 above, particularly to the discussion of (502), (510), (512), (514), and (526).

In some embodiments, (1) the storage system comprises (724) a plurality of distinct sections, each section coupled to a distinct power supply; (2) the count of active memory commands comprises a count of active memory commands in a first section of the plurality of distinct sections; and (3) deferring execution of the one or more memory commands comprises deferring execution of one or more active memory commands in the first section. In some embodiments, the storage system includes a plurality of power throttling modules, each power throttling module corresponding to a distinct section. In some embodiments, for each section in the plurality of distinct sections, one or more of the respective power thresholds are based on one or more properties of the corresponding power supply. In some instances, at a given time, power throttling occurs in a first section of the storage device, but does not occur in one or more other sections of the storage device.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of operation in a storage system, the method comprising:

obtaining a power metric corresponding to a weighted count of active memory commands in the storage system, wherein active memory commands are commands being executed by the storage system and the weighted count includes a first weight for a first active memory command and a second weight, different from the first weight, for a second active memory command; and in accordance with a determination that the power metric satisfies one or more power thresholds, deferring execution of one or more pending memory commands.

2. The method of claim 1, wherein the storage system comprises a plurality of distinct sets of storage devices, and the plurality of distinct sets of non-volatile memory devices includes a first distinct set of non-volatile memory devices and a second distinct set of non-volatile memory devices; and wherein deferring execution of the one or more pending memory commands comprises:

for each distinct set of storage devices in at least a subset of the plurality of distinct sets of storage devices, deferring execution of the one or more pending memory commands corresponding to a respective set of storage devices during a respective wait period;

wherein the respective wait period for the first distinct set of storage devices is determined by the storage system such that the respective wait period for the first distinct set of non-volatile memory devices is at least partially non-overlapping with the respective wait period for the second distinct set of non-volatile storage devices in the at least a subset of the plurality of distinct sets.

3. The method of claim 1, wherein the storage system comprises a plurality of distinct sets of storage devices and wherein the weighted count of active memory commands comprises a count of active memory commands within a subset of the plurality of distinct sets of storage devices.

4. The method of claim 1, further comprising:

obtaining a second power metric; and adjusting at least one of the one or more power thresholds based on the obtained second power metric.

5. The method of claim 4, wherein the second power metric corresponds to a measure of heat associated with the storage device.

6. The method of claim 4, wherein the second power metric corresponds to a measure of a current drawn by the storage device.

7. The method of claim 4, wherein the second power metric corresponds to a measure of power consumption of the storage device.

8. The method of claim 4, wherein the second power metric is based at least in part on a parameter in an external command.

9. The method of claim 1, further comprising adjusting at least one of the one or more power thresholds based on a mode of operation of the storage system.

10. The method of claim 1, wherein each memory command of the active memory commands has a respective memory command type of a plurality of distinct memory command types; and wherein each distinct memory command type has a respective weight.

11. The method of claim 1, wherein the storage system comprises a plurality of distinct sections, each section coupled to a distinct power supply;
- wherein the weighted count of active memory commands comprises a weighted count of active memory commands in a first section of the plurality of distinct sections; and
- wherein deferring execution of the one or more pending memory commands comprises deferring execution of the one or more pending memory commands in the first section.

12. A storage device comprising:
a power throttling module;
one or more non-volatile memory controllers coupled to the power throttling module; and
a plurality of non-volatile memory devices, each non-volatile memory device in the plurality of non-volatile memory devices coupled to a particular non-volatile memory controller of the one or more non-volatile memory controllers, the storage device configured to:
- obtain a power metric corresponding to a weighted count of active memory commands in the storage device, wherein active memory commands are commands being executed by the storage device and the weighted count includes a first weight for a first active memory command and a second weight, different from the first weight, for a second active memory command; and
- in accordance with a determination that the power metric satisfies one or more power thresholds, defer execution of one or more pending memory commands.

13. The storage device of claim 12, wherein the plurality of non-volatile memory devices comprise a plurality of distinct sets of memory devices, and the plurality of distinct sets of non-volatile memory devices includes a first distinct set of non-volatile memory devices and a second distinct set of non-volatile memory devices; and
- wherein deferring execution of the one or more pending memory commands comprises:
  - for each distinct set of memory devices in at least a subset of the plurality of distinct sets of memory devices, deferring execution of the one or more pending memory commands corresponding to a respective set of memory devices during a respective wait period;
  - wherein the respective wait period for the first distinct set of memory devices is determined by the storage system such that the respective wait period for the first distinct set of non-volatile memory devices is at least partially non-overlapping with the respective wait period for the second distinct set of non-volatile memory devices in the at least a subset of the plurality of distinct sets.

14. The storage device of claim 12, the storage device further configured to obtain a second power metric and adjust at least one of the one or more power thresholds based on the obtained second power metric.

15. The storage device of claim 12, the storage device further configured to adjust at least one of the one or more power thresholds based on a mode of operation of the storage device.

16. The storage device of claim 12,
- wherein each memory command of the active memory commands has a respective memory command type of a plurality of distinct memory command types; and
- wherein each distinct memory command type has a respective weight.

17. A non-transitory computer-readable storage medium storing one or more programs for execution by one or more processors of a storage system, the one or more programs including instructions for:
- obtaining a power metric corresponding to a weighted count of active memory commands in the storage system, wherein the active memory commands are commands being executed by the storage system and the weighted count includes a first weight for a first active memory command and a second weight, different form the first weight, for a second active memory command; and
- in accordance with a determination that the power metric satisfies one or more power thresholds, deferring execution of one or more pending memory commands.

18. The computer-readable storage medium of claim 17, wherein the storage system comprises a plurality of distinct sets of storage devices, and the plurality of distinct sets of non-volatile memory devices includes a first distinct set of non-volatile memory devices includes a first distinct set of non-volatile memory devices and a second distinct set of non-volatile memory devices; and
- wherein deferring execution of the one or more pending memory commands comprises:
  - for each distinct set of storage devices in at least a subset of the plurality of distinct sets of storage devices, deferring execution of the one or more pending memory commands corresponding to a respective set of storage devices during a respective wait period;
  - wherein the respective wait period for the first distinct set of storage devices is determined by the storage system such that the respective wait period for the first distinct set of non-volatile memory devices is at least partially non-overlapping with the respective wait period for the second distinct set of non-volatile storage devices in the at least a subset of the plurality of distinct sets.

19. The computer-readable storage medium of claim 17, the one or more programs further including instructions for obtaining a second power metric and adjusting at least one of the one or more power thresholds based on the obtained second power metric.

20. The computer-readable storage medium of claim 17, the one or more programs further including instructions for adjusting at least one of the one or more power thresholds based on a mode of operation of the storage system.

21. The computer-readable storage medium of claim 17,
- wherein each memory command of the active memory commands has a respective memory command type of a plurality of distinct memory command types; and
- wherein each distinct memory command type has a respective weight.

\* \* \* \* \*

UNITED STATES PATENT AND TRADEMARK OFFICE
CERTIFICATE OF CORRECTION

PATENT NO.        : 9,575,677 B2
APPLICATION NO.   : 14/572633
DATED             : February 21, 2017
INVENTOR(S)       : Ellis et al.

Page 1 of 1

It is certified that error appears in the above-identified patent and that said Letters Patent is hereby corrected as shown below:

In the Claims

Claim 17, Column 30, Line 17, please delete "form" and insert --from--.

Signed and Sealed this
Twenty-fifth Day of April, 2017

Michelle K. Lee
*Director of the United States Patent and Trademark Office*